US011128774B2

(12) United States Patent
Muto

(10) Patent No.: US 11,128,774 B2
(45) Date of Patent: Sep. 21, 2021

(54) IMAGE READING APPARATUS HAVING SENSOR FOR DETECTING SHAPE OF FED DOCUMENTS, CONTROL METHOD FOR CONTROLLING IMAGE READING APPARATUS, AND STORAGE MEDIUM HAVING STORED THEREIN CONTROL METHOD

(71) Applicant: CANON KABUSHIKI KAISHA, Tokyo (JP)

(72) Inventor: Tsuyoshi Muto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/372,774

(22) Filed: Apr. 2, 2019

(65) Prior Publication Data

US 2019/0260897 A1    Aug. 22, 2019

Related U.S. Application Data

(63) Continuation of application No. 15/819,972, filed on Nov. 21, 2017, now Pat. No. 10,291,804.

(30) Foreign Application Priority Data

Nov. 29, 2016    (JP) .................................. 2016-231319

(51) Int. Cl.
*H04N 1/00* (2006.01)
(52) U.S. Cl.
CPC ..... *H04N 1/00777* (2013.01); *H04N 1/00599* (2013.01); *H04N 1/00663* (2013.01);
(Continued)

(58) Field of Classification Search
CPC ........... H04N 1/00777; H04N 1/00663; H04N 1/00793; H04N 1/0057
(Continued)

(56) References Cited

U.S. PATENT DOCUMENTS

2004/0022563 A1\*  2/2004  Maruchi ................ G03G 15/60
                                                        399/365
2009/0201561 A1    8/2009  Hwang
(Continued)

FOREIGN PATENT DOCUMENTS

CN         101165609 A      4/2008
CN         103309632 A      9/2013
(Continued)

*Primary Examiner* — Jamares Q Washington
(74) *Attorney, Agent, or Firm* — Canon U.S.A., Inc. I.P. Division

(57) ABSTRACT

An image reading apparatus includes a conveying unit configured to convey a document, a reading unit configured to read an image on the conveyed document, a measurement unit configured to measure a distance from an upper portion of a sheet feeding port for the document to an upper surface of the document, and a control unit configured to, according to the distance measured by the measurement unit, suspend the conveyance of the document by the conveying unit. According to a user operation for reading again the document of which the reading is suspended by the control unit, the conveying unit conveys the document and the reading unit reads the image on the document, and while the document of which the conveyance is suspended is conveyed again, the control unit does not suspend the conveyance of the document based on the distance measured by the measurement unit.

13 Claims, 15 Drawing Sheets

(52) U.S. Cl.
CPC ..... *H04N 1/00726* (2013.01); *H04N 1/00793* (2013.01); *H04N 2201/0094* (2013.01)

(58) Field of Classification Search
USPC ...... 358/1.14, 1.12; 271/3.15, 264; 399/367, 399/408, 411, 68
See application file for complete search history.

(56) References Cited

U.S. PATENT DOCUMENTS

| | | | | |
|---|---|---|---|---|
| 2011/0290924 A1 ‡ | 12/2011 | Romanovich | ....... | B02C 18/0007 |
| | | | | 241/36 |
| 2014/0054850 A1 ‡ | 2/2014 | Umi | ......... | B65H 5/00 |
| | | | | 271/264 |
| 2016/0185544 A1 * | 6/2016 | Link | ...... | B65H 43/04 |
| | | | | 271/265.02 |
| 2017/0013140 A1 * | 1/2017 | Tachibana | .......... | H04N 1/00013 |

FOREIGN PATENT DOCUMENTS

| | | | | |
|---|---|---|---|---|
| CN | 104354480 A | | | 2/2015 |
| JP | H11-331482 A | | | 11/1999 |
| JP | 2001285595 A | ‡ | | 10/2001 |
| JP | 2004-182449 A | | | 7/2004 |
| JP | 2004182449 A | ‡ | | 7/2004 |
| JP | 2014-051337 A | | | 3/2014 |
| JP | 2016-005200 A | | | 1/2016 |

\* cited by examiner
‡ imported from a related application

IMAGE READING APPARATUS HAVING SENSOR FOR DETECTING SHAPE OF FED DOCUMENTS, CONTROL METHOD FOR CONTROLLING IMAGE READING APPARATUS, AND STORAGE MEDIUM HAVING STORED THEREIN CONTROL METHOD

CROSS-REFERENCE TO RELATED APPLICATION

This application is a Continuation of U.S. application Ser. No. 15/819,972, filed Nov. 21, 2017, which claims the benefit of Japanese Patent Application No. 2016-231319, filed Nov. 29, 2016, all of which are hereby incorporated by reference herein in their entirety.

BACKGROUND

Field

Aspects of the present invention relate to an image reading apparatus, a control method for controlling an image reading apparatus, and a storage medium having stored therein a control method.

Description of the Related Art

Conventionally, as an image reading apparatus used in a copying machine, the publication of Japanese Patent Application Laid-Open No. 2001-285595 discusses an image reading apparatus for causing an automatic document feeder (ADF) to convey document sheets one by one and causing a charge-coupled device (CCD) sensor fixed on the conveying path of the documents to read an image of each document sheet.

In the image reading apparatus having the above configuration, there is a case where when a document is conveyed, a bundle of document sheets from which staples or clips are not removed is stacked on a document tray, and a reading instruction is given. The ADF is configured such that a separation mechanism of a conveying unit separates and conveys document sheets one by one. Thus, if a conveying operation is started in the state where a bundle of bound document sheets is stacked, a load is applied to a bound portion when a document sheet on the top surface is separated and conveyed.

Consequently, the document sheets may become wrinkled or torn. Further, the bound document sheets are sent without being separated, whereby a paper jam may occur on the conveying path.

In response, to avoid such a situation, an apparatus for detecting that a document is bound by staples or clips is discussed.

For example, the publication of Japanese Patent Application Laid-Open No. 2004-182449 discusses an apparatus having a configuration for, to determine the presence or absence of a bound portion obtained by stapling, clipping, or gluing in a document stacked on a document tray, detecting a change in the height of the document when the document is conveyed, and determining the presence or absence of a bound portion.

The technique discussed in Japanese Patent Application Laid-Open No. 2004-182449 detects a change in the height of the document when the document is conveyed. In a case where the document is already bent or wrinkled before being conveyed, it may be erroneously determined that the document is a bound document although the document is not bound. Then, even if the document is replaced, erroneous detection is continuously made.

Further, the conventional technique does not illustrate a method regarding how to read a document after a bound document is detected. This is unfriendly to a user.

Further, in a case where a stapled bound document is detected, the document cannot be read in this bound state by an ADF. Thus, a job is stopped, and the user is instructed to place the document on a document platen and execute continuous reading from the start as a new job, or an appropriate operation instruction is not given to the user.

SUMMARY OF THE INVENTION

Aspects of the present invention are directed to providing a mechanism capable of, in a case where the fact that the shape state of a document to be conveyed is not normal is caused by the state of the document, receiving from a user an instruction to read the document, without detecting whether the above shape state is not normal.

According to an aspect of the present invention, an image reading apparatus includes a conveying unit configured to convey a document, a reading unit configured to read an image on the document conveyed by the conveying unit, a measurement unit configured to measure a distance from an upper portion of a sheet feeding port for the document to an upper surface of the document, and a control unit configured to, according to the distance measured by the measurement unit, suspend the conveyance of the document by the conveying unit, wherein according to a user operation for reading again the document of which the reading is suspended by the control unit, the conveying unit conveys the document and the reading unit reads the image on the document, and wherein, while the document of which the conveyance is suspended is conveyed again, the control unit does not suspend the conveyance of the document based on the distance measured by the measurement unit.

Further features of aspects of the present invention will become apparent from the following description of exemplary embodiments with reference to the attached drawings.

DESCRIPTION OF THE EMBODIMENTS

Next, with reference to the drawings, exemplary embodiments for carrying out aspects of the present invention will be described.

<Description of System Configuration>

Figure 1:
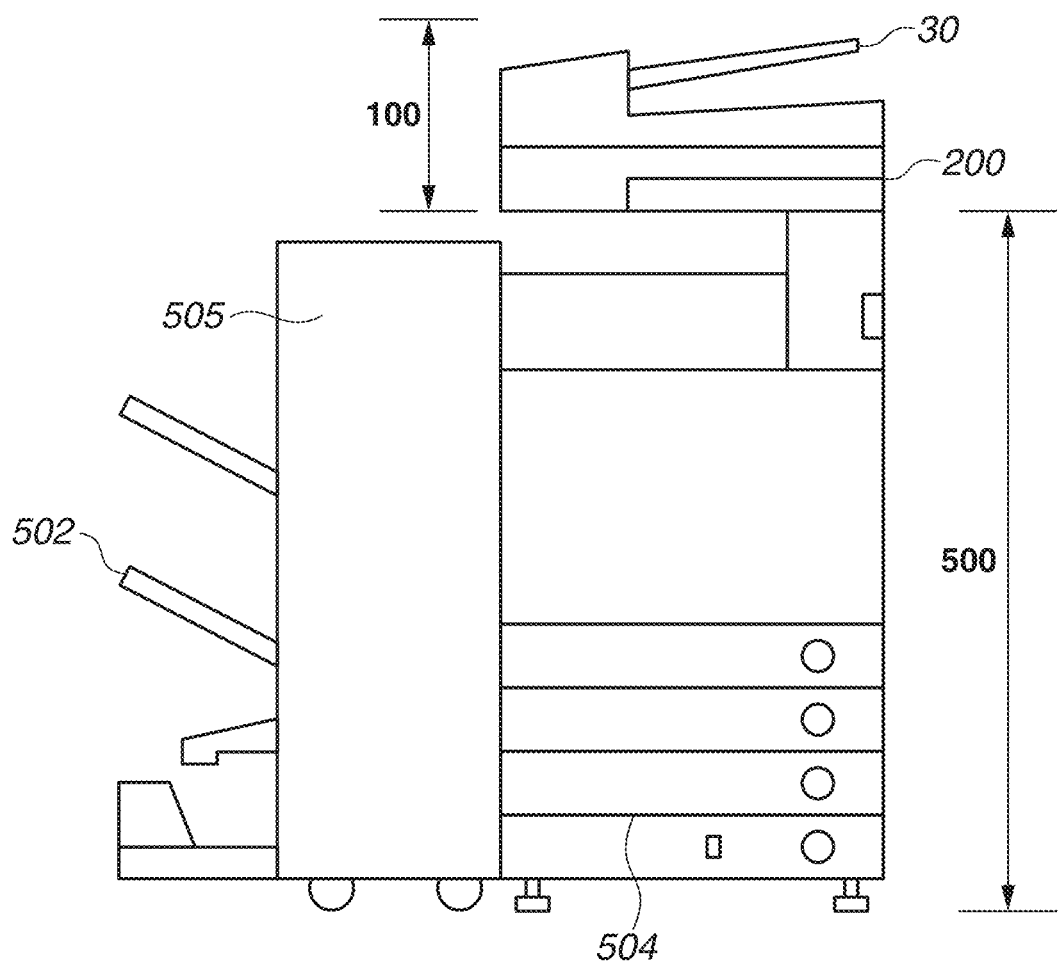
FIG. 1 is a diagram illustrating an example of an external appearance of an image forming apparatus.

FIG. 1 is a diagram illustrating an example of the external appearance of an image forming apparatus according to a first exemplary embodiment. This example is described using as an example a multifunction printer (MFP) capable of executing a scan function, a copy function, a print function, and a send function.

In FIG. 1, an image reading unit 200 inputs, to a linear image sensor (a charge-coupled device (CCD) sensor), reflected light obtained by causing an illumination lamp to emit light to perform exposure scanning on an image on a document, thereby converting information of the image into an electric signal. The image reading unit 200 further converts the electric signal into luminance signals of red (R), green (G), and blue (B) colors and outputs the luminance signals as image data to a controller unit 400.

Document sheets are set on a document tray 30 of an automatic document feeder (hereinafter, "ADF") 100. If a user gives an instruction through an operation unit 405 to start reading the document sheets, the controller unit 400 sends a reading instruction to read the document sheets to the image reading unit 200. When receiving this instruction, the image reading unit 200 separates and feeds the document sheets one by one from the document tray 30 of the ADF 100, and performs a reading operation for reading the document sheets. Further, it is also possible to read a document sheet by placing the document sheet on document platen glass 202. An image forming unit 500 is an image forming device for forming, on a sheet, image data received from the controller unit 400.

An image forming method according to the present exemplary embodiment is an electrophotographic method using photosensitive drums and photosensitive belts. Further, the image forming unit 500 includes as a sheet feeding unit 504 a plurality of cassettes compatible with different sheet sizes or different sheet directions. Further, a sheet on which printing is completed is discharged to a sheet discharge unit 502 or a finisher unit 505.

(Example of Configuration of ADF 100)

Figure 2:
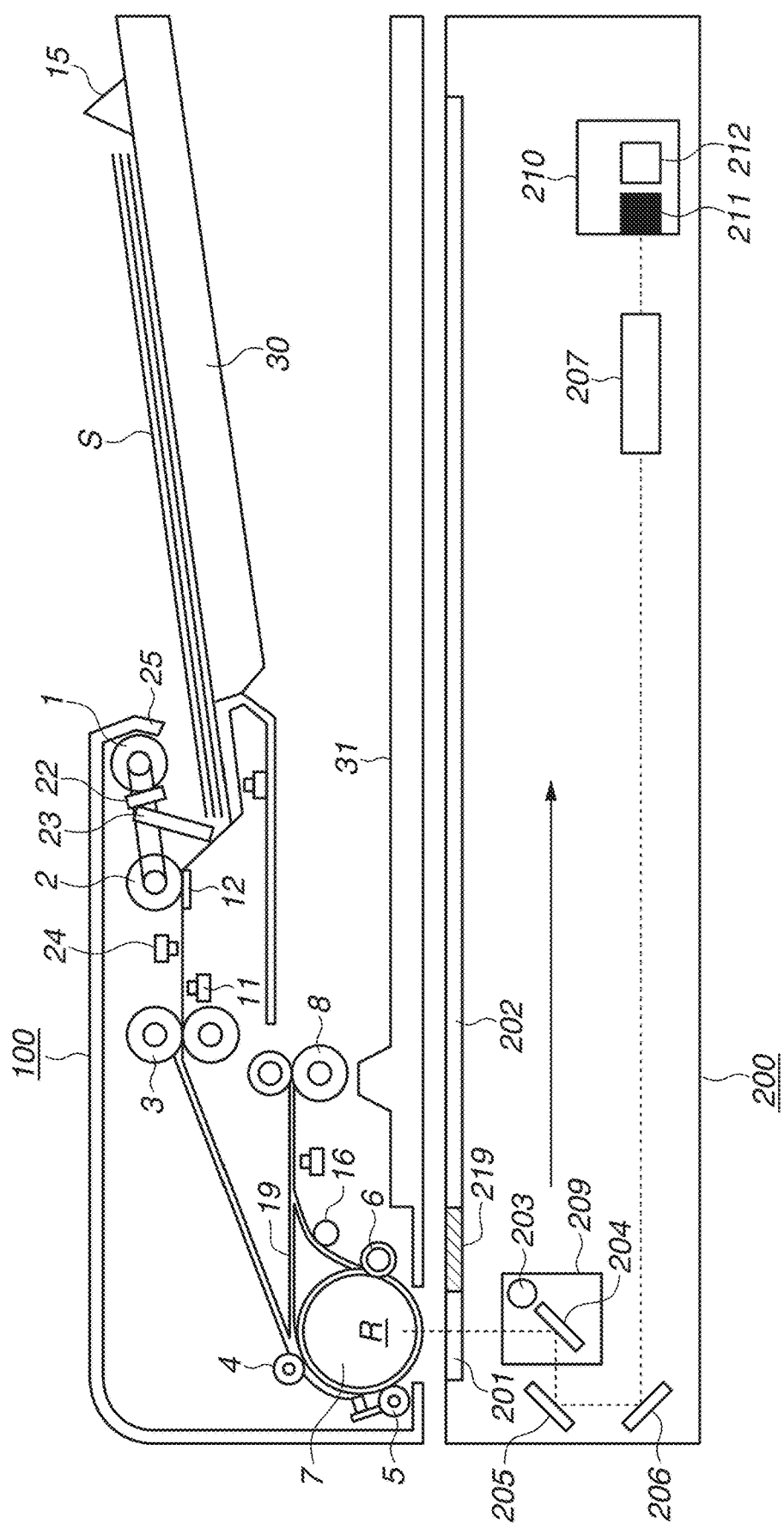
FIG. 2 is a cross-sectional view illustrating examples of configurations of an automatic document feeder (ADF) and an image reading unit.

FIG. 2 is a cross-sectional view illustrating examples of the configurations of the ADF 100 and the image reading unit 200 according to the present exemplary embodiment. With reference to FIG. 2, the operation of the ADF 100 is described below.

In FIG. 2, the ADF 100 includes the document tray 30, on which a document S including one or more document sheets is stacked, a separation pad 12, which prevents the document S from protruding from the document tray 30 to advance downstream before the conveyance of the document S is started, and a sheet feeding roller 1. Further, the ADF 100 includes a document detection sensor 23, which detects that the document S is placed on the document tray 30, a distance measurement sensor 22, which measures the distance from the top surface of the document S, and a separation sensor 24, which detects that the document S passes through a separation roller 2. A sheet feeding port 25 is a port for feeding the document S into the inside of the ADF 100. The distance to be measured by the distance measurement sensor 22 is a distance from the sheet feeding port 25 to the top surface of the document S.

The sheet feeding roller 1 falls on the document surface of the document S stacked on the document tray 30 and rotates. Consequently, a document sheet on the top surface of the bundle of document sheets is fed. The document sheet conveyed by the sheet feeding roller 1 is separated as a single sheet by the actions of the separation roller 2 and the separation pad 12. This separation is achieved by a known retard separation technique. At this time, even if a predetermined time (t1) elapses from the start of the conveyance, and if the separation sensor 24 cannot detect the document sheet, the driving of the sheet feeding roller 1 is stopped. The predetermined time (t1) until the driving is stopped is obtained by adding a sufficient time taking into account the time of arrival to the separation sensor 24 from the start of the conveyance and a delay that are estimated according to the conveying speed.

The document sheet separated by the separation roller 2 and the separation pad 12 is conveyed to a registration roller 4 by a conveying roller pair 3 and is hit against the registration roller 4. Consequently, the document sheet is formed into a loop, thereby removing the skew of the conveyance of the document sheet. Downstream of the registration roller 4, a sheet feeding path for conveying in the direction of a skimming-through glass 201 the document sheet having passed through the registration roller 4 is placed.

The document sheet sent to the sheet feeding path is sent onto the platen by a large roller 7 and a conveying roller 5. At this time, the large roller 7 comes into contact with the skimming-through glass 201. The document sheet conveyed by the large roller 7 passes through a conveying roller 6, moves between a roller 16 and movement glass, and is discharged to a document discharge tray 31 through a sheet discharge flapper and sheet discharge rollers 8.

The ADF 100 in FIG. 2 reads an image of the back surface of the document sheet by reversing the document sheet. In the state where the document sheet is inserted between the sheet discharge rollers 8, the sheet discharge rollers 8 are rotated backward to switch the sheet discharge flapper, thereby moving the document sheet to a reverse path 19. The moved document sheet is hit against the registration roller 4 from the reverse path 19 and formed into a loop again, thereby removing the skew of the conveyance of the document sheet. Then, the document sheet is moved to the skimming-through glass 201 again by the conveying roller 5 and the large roller 7. Thus, it is possible to read the back surface of the document sheet through the skimming-through glass 201.

Further, in the document tray 30, a guide regulation plate 15 is provided, which can slide in a sub-scanning direction of the bundle of document sheets stacked on the document tray 30, and a document width detection sensor (not illustrated) is also provided, which detects the document width in conjunction with the guide regulation plate 15.

By the combination of the document width detection sensor and a pre-registration sensor 11, it is possible to distinguish the document size of the bundle of document sheets stacked on the document tray 30. Further, the document length detection sensor (not illustrated) provided in a conveying path can also detect the document length based on the conveyance distance between the detection of the front end of a document sheet that is being conveyed and the detection of the rear end of the document sheet. Further, also by the combination of the detected document length and the document width detection sensor, it is possible to distinguish the document size.

Further, the distance measurement sensor 22 is a sensor for measuring the distance from the top surface of the document S stacked on the document tray 30. For example, the distance measurement sensor 22 measures the difference between the distance from the top surface of the document S measured before the start of the conveyance of each document sheet, and the distance from the top surface of the document S measured a predetermined time (t2) after the start of the conveyance. Thus, the distance measurement sensor 22 can detect the document S having an unusual shape such as being bound by staples. Further, a setting is made such that t1>t2, whereby it is possible to detect an unusual shape in the document S before a jam occurs.

In the exemplary embodiments discussed in the specification, an unusual shape is detected in a document using the above method. Alternatively, an unusual shape may be detected in a document to be conveyed, using another method. For example, the distance measurement sensor 22 measures the distance from the top surface of the document S. If a value measured by the distance measurement sensor is smaller than a predetermined threshold, an image reading apparatus may detect an unusual shape in the document S.

(Example of Configuration of Image Reading Unit 200)

The image reading unit 200 causes a scanner unit 209 to scan a document sheet on the document platen glass 202 in a sub-scanning direction indicated by an arrow in FIG. 2, thereby optically reading image information recorded on the document sheet.

Further, regarding document sheets on the ADF 100, document sheets on the document tray 30 are conveyed one by one to a reading center position. Further, the scanner unit 209 is moved to a reading center position of the large roller 7 of the ADF 100, and each document sheet is read at the reading center position of the large roller 7. The document sheet on the ADF 100 or the document sheet on the document platen glass 202 is read by the following optical system. This optical system includes the skimming-through glass 201, the document platen glass 202, the scanner unit 209, which includes a lamp 203 and a mirror 204, mirrors 205 and 206, a lens 207, and a CCD sensor unit 210. The optical system photoelectrically converts read image information and inputs the image information as image data to a controller unit not illustrated in FIG. 1. Further, a white plate 219 is a white plate for creating reference data for a white level by shading. In the present exemplary embodiment, the CCD sensor unit 210 includes a color image reading (RGB) CCD (3-line sensor unit) 212 and a monochrome image reading CCD (1-line sensor unit) 211.

(Control Block of ADF 100)

Figure 3:
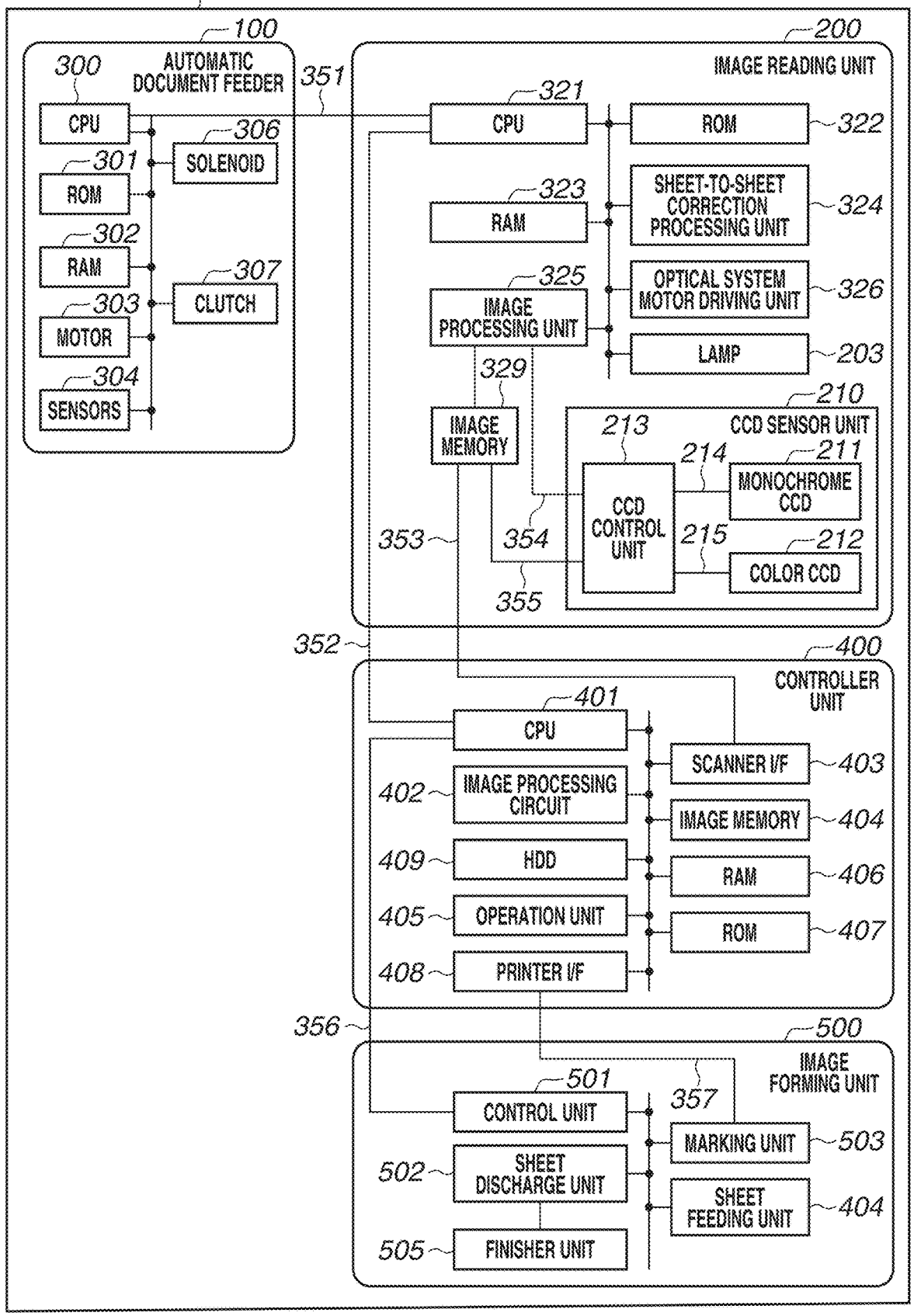
FIG. 3 is a block diagram illustrating a configuration of the image forming apparatus.

FIG. 3 is a block diagram illustrating the configuration of the image forming apparatus according to the present exemplary embodiment.

In FIG. 3, the control block of the ADF 100 includes a control unit (hereinafter, "CPU") 300, which is a central processing unit, a read-only memory (hereinafter, "ROM") 301, a random-access memory (hereinafter, "RAM") 302, an output port, and an input port. The ROM 301 stores a control program and a fixed parameter. The RAM 302 stores input data and work data. The output port is connected to a motor 303, which drives various conveying rollers, a solenoid 306, and a clutch 307. The input port is connected to each of various sensors 304.

The CPU 300 controls sheet conveyance according to a control program stored in the ROM 301 connected to the CPU 300 via a bus line. The CPU 300 performs serial communication with a central processing unit (CPU) 321 of the image reading unit 200 via a control communication line 351, and transmits and receives control data to and from the image reading unit 200. Further, the image reading unit 200 is also notified of an image front signal, which is a reference for the front end of document image data, through the control communication line 351.

Further, according to the control data from the CPU 321 of the image reading unit 200, the CPU 300 notifies the image reading unit 200 of the values of the various sensors 304. The values of the various sensors 304 also include data measured by the distance measurement sensor 22 and distance data.

(Control Block of Image Reading Unit 200)

In the control block of the image reading unit 200, the CPU 321 performs overall control of the image reading unit 200. The CPU 321 is connected to a ROM 322, which stores a program, and a RAM 323, which provides a work area. The RAM 323 illustrates a work area also including an area where non-volatile storage is performed.

An optical system motor driving unit 326 is a driver circuit for driving an optical system driving motor. The image reading unit 200 is connected to the lamp 203 and the CCD sensor unit 210 (the monochrome image reading CCD 211 for a surface image and the color image reading CCD 212 for a surface image). The CPU 321 controls the optical system motor driving unit 326, and controls the CCD sensor unit 210 via an image processing unit 325, thereby performing an image reading process.

To achieve sheet conveyance, the CPU 321 sends a command regarding sheet conveyance control to the CPU 300 for sheet conveyance control in the ADF 100 via the control communication line 351, thereby instructing the CPU 300 to perform sheet conveyance control. The instructed CPU 300 monitors the sensors 304 placed on the conveying path and drives the motor 303, the solenoid 306, and the clutch 307 for conveyance, which are loads, thereby achieving sheet conveyance. As described above, the CPU 321 performs sheet conveyance using the ADF 100 and image reading control using the image reading unit 200. A sheet-to-sheet correction processing unit 324 makes sheet-to-sheet correction.

An image signal based on which an image is formed on the CCD sensor unit 210 (either of the color image reading (RGB) CCD 212 and the monochrome image reading CCD 211) by the lens 207 is converted into digital image data. The converted image data is subjected to various types of image processing, such as shading, for detecting and correcting a line image on the image data by the image processing unit 325 and written to an image memory 329.

The data written in the image memory 329 is sequentially transmitted to the controller unit 400 through a controller/interface image communication line 353, which includes an image transfer clock signal line. Further, the timing of an image front signal as a reference for the front end of document image data is adjusted by the CPU 321, and the controller unit 400 is notified of the image front signal through a controller/interface control communication line 352. Also the timing of an image front signal notified through a communication line from the ADF 100 is similarly adjusted by the CPU 321 of the image reading unit 200, and the controller unit 400 is notified of the image front signal through the controller/interface control communication line 352.

The CPU 321 controls the image processing unit 325, which is connected on a control bus line. Further, the CPU 321 transmits a control signal to the CCD sensor unit 210 via the image processing unit 325 and from a control communication line 354, thereby controlling the CCD sensor unit 210. In the process of scanning a document image using the CCD sensor unit 210, the document image is read by the color image reading CCD 212 or the monochrome image reading CCD 211. Then, a read analog image signal for each line is output to the CCD control unit 213 from an image data communication line 214 or 215, which includes an image transfer clock signal line.

The analog signal is converted into digital image data by the CCD control unit 213, and the digital image data is transmitted to the controller unit 400 from an image communication line 355, which includes an image transfer clock signal line, via the image memory 329, and through the image communication line 353.

The CPU 321 performs serial communication with a CPU 401 of the controller unit 400 via the controller/interface control communication line 352, and transmits and receives control data to and from the controller unit 400. According to the control data from the CPU 401 of the controller unit 400, the CPU 321 detects an unusual shape in the document S that is being conveyed. In the detection of an unusual shape, the CPU 321 calculates the difference between the distance from the top surface of the document S measured before the start of the conveyance of each document sheet, and the distance from the top surface of the document S measured the certain time (t2) after the start of the conveyance. If there is a difference (dl) equal to or greater than a certain value, the CPU 321 determines that the document S has an unusual shape. Then, the CPU 321 notifies the CPU 401 of the controller unit 400 of the determination result.

(Control Block of Controller Unit 400)

The controller unit 400 for image processing is a device for controlling the entirety of an image forming apparatus 2000, which includes the ADF 100, the image reading unit 200, and the image forming unit 500. The controller unit 400 includes the CPU 401, an image processing circuit 402, a scanner interface (IF) 403, an image memory 404, an operation unit 405, a RAM 406, which provides a work area, a ROM 407, which stores a program, a printer IF 408, and a hard disk drive (HDD) 409. The RAM 406 illustrates a work area also including an area where non-volatile storage is performed.

Alternatively, the configuration may be such that a program is loaded from the HDD 409 into the RAM 406 and executed by the CPU 401. Image data transmitted to the controller unit 400 through the image communication line 353 is saved in the image memory 404 through the scanner IF 403.

The image processing circuit 402 converts an image on the image memory 404 and returns the image to the image memory 404 again. Examples of the image conversion process performed by the image processing circuit 402 include a rotation process for rotating an image in the unit of 32 pixels×32 pixels at a specified angle, and a resolution conversion process for converting the resolution of an image.

Examples of the image conversion process performed by the image processing circuit 402 further include a magnification process for changing the magnification of an image, and a color space conversion process for performing matrix calculation on an image subjected to multi-valued input and converting a YUV image into a Lab image based on a lookup table (LUT). The color space conversion includes 3×8 matrix calculation and a one-dimensional LUT, and thereby can perform known background removal and show-through prevention.

The operation unit 405 includes a liquid crystal display (LCD) unit, a touch panel input device attached to the LCD unit, and a plurality of hardware keys. A signal input using the touch panel or the hardware keys is transmitted to the CPU 401. Then, on the LCD unit, functions in operations on the image forming apparatus 2000 are displayed, or image data is displayed.

The controller unit 400 receives an image front signal from the image forming unit 500 through a controller/interface control communication line 356. Data written in the image memory 404 based on the image front signal as a reference for the front end of image data is sequentially transmitted to the image forming unit 500 through a controller/interface image communication line 357, which includes an image transfer clock signal line, via the printer IF 408.

(Control Block of Image Forming Unit 500)

The image forming unit 500 conveys a recording sheet, prints image data as a visible image on the recording sheet, and discharges the recording sheet to outside the apparatus. The image forming unit 500 includes a control unit 501, which controls the image forming unit 500, the sheet feeding unit 504, which includes a plurality of types of recording sheet cassettes, and a marking unit 503, which has the function of transferring image data onto a recording sheet and fixing the image data. The image forming unit 500 further includes the sheet discharge unit 502, which has the function of outputting a recording sheet on which an image is printed to outside the apparatus, and the finisher unit 505, which performs a punching process and a sorting process.

In a case where the marking unit 503 is prepared for image formation, the control unit 501 transmits an image front signal as a reference for the front end to the controller unit 400 through the controller/interface control communication line 356. Then, the marking unit 503 transfers image data sent through the controller/interface image communication line 357 onto a recording sheet and fixes the image data.

[Configuration of Operation Unit 405]

Figure 4:
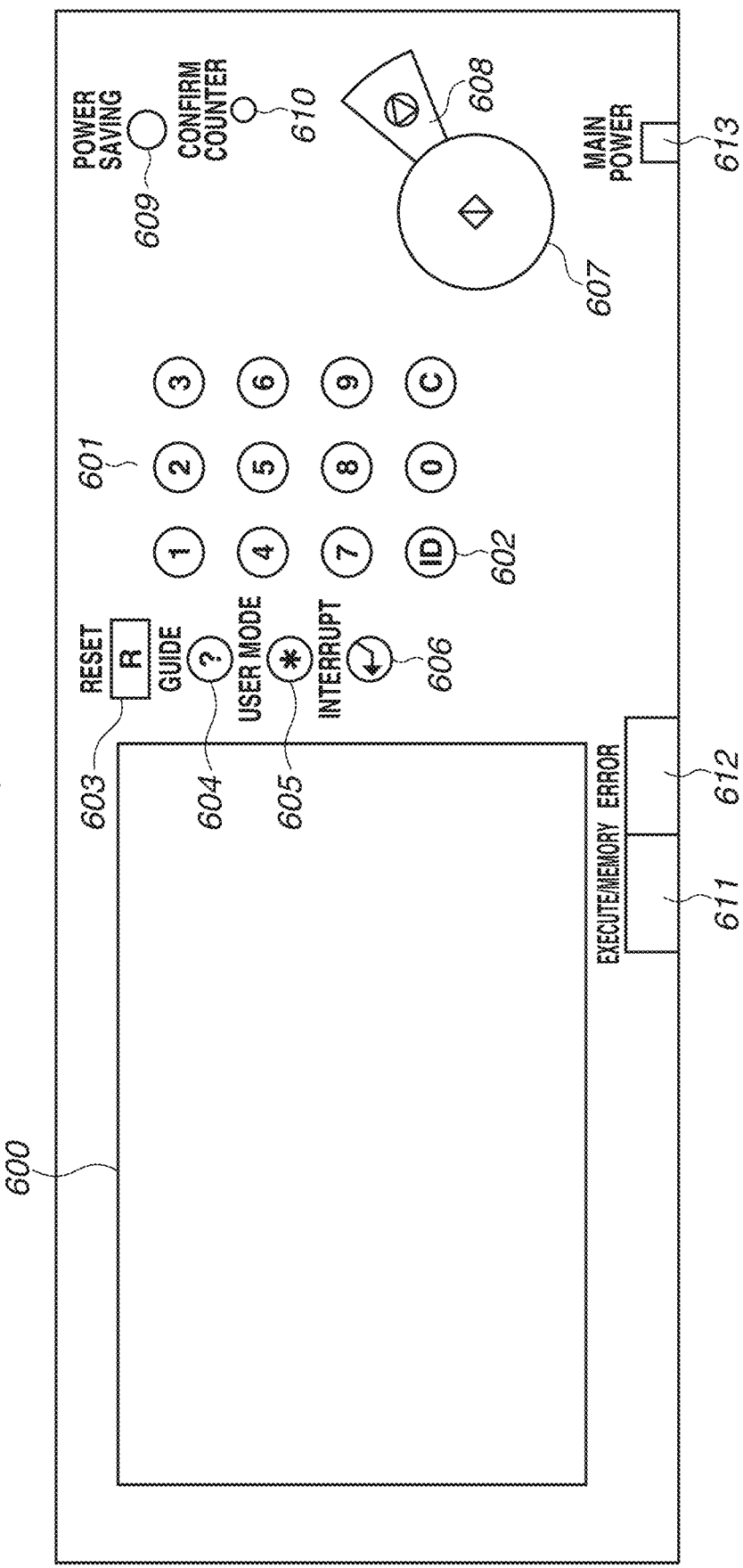
FIG. 4 is a plan view illustrating a configuration of an operation unit.

FIG. 4 is a plan view illustrating the configuration of the operation unit 405 illustrated in FIG. 3.

FIG. 4 illustrates an LCD touch panel 600, on which main mode settings are made, and the state of the apparatus is displayed. A numeric keypad 601 is used to input numerical values from 0 to 9. An identification (ID) key 602 is used to input a department number and an identification mode in a case where the apparatus is managed on a departmental basis.

A reset key 603 is used to reset a set mode. A guide key 604 is used to display a screen for explaining each mode. An interrupt key 606 is used to perform interrupt copying. A start key 607 is used to start a copy operation or a scan operation. A stop key 608 is used to stop a job that is being executed. A user mode key 605 is used to enter a user mode screen. On the user mode screen, it is possible to make various settings regarding the apparatus. A power saving key 609 is pressed to enter a power saving state and pressed again to return from the power saving state. A confirm counter key 610 is pressed to display on the LCD a count screen indicating the total number of copies that have been used.

A light-emitting diode (LED) 611 indicates that a job is being executed, or an image is being accumulated in an image memory. An error LED 612 indicates that the apparatus is in an error state such as a jam or the opening of a door. A power LED 613 indicates that a main switch of the apparatus is on.

[Copy Screen]

Figure 5:
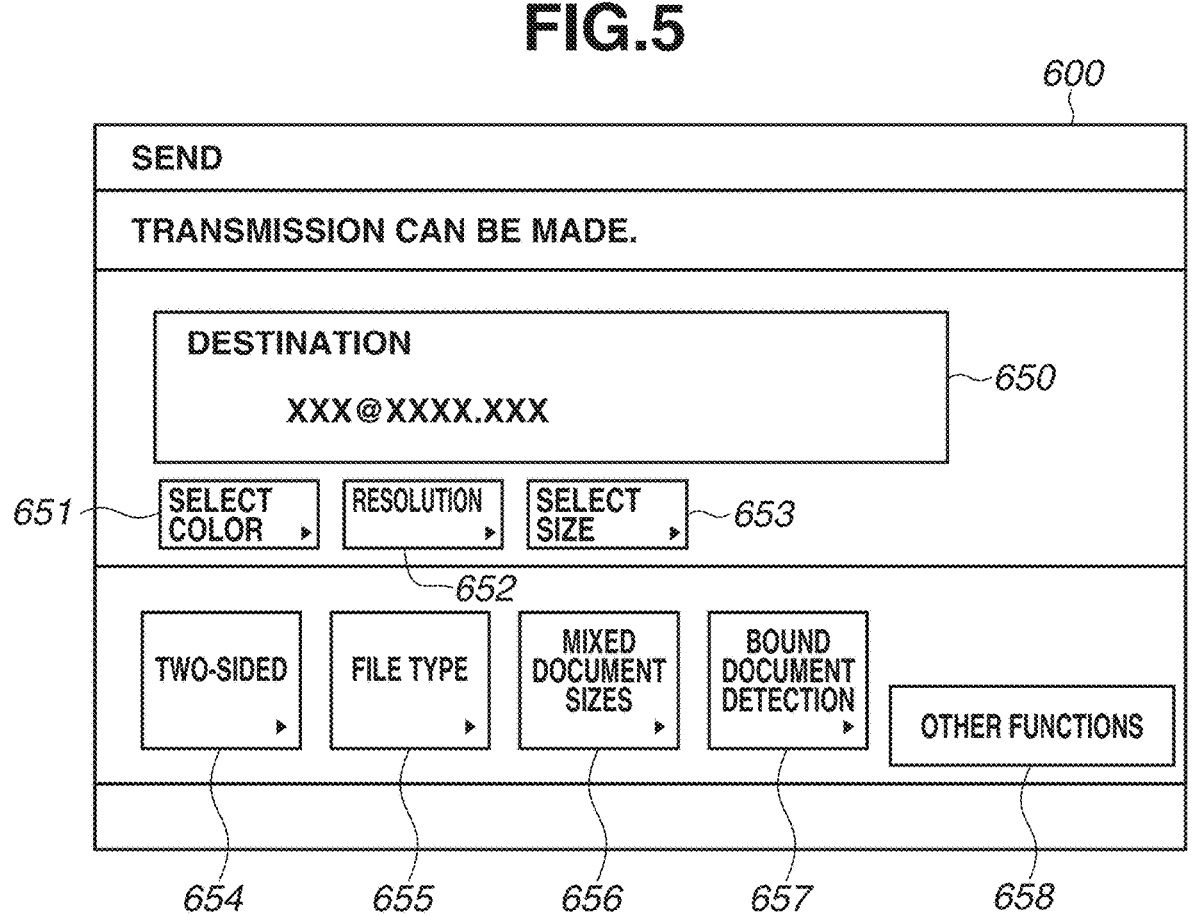
FIG. 5 is a diagram illustrating a user interface (UI) screen displayed on a liquid crystal display (LCD) touch panel.
Figure 6:
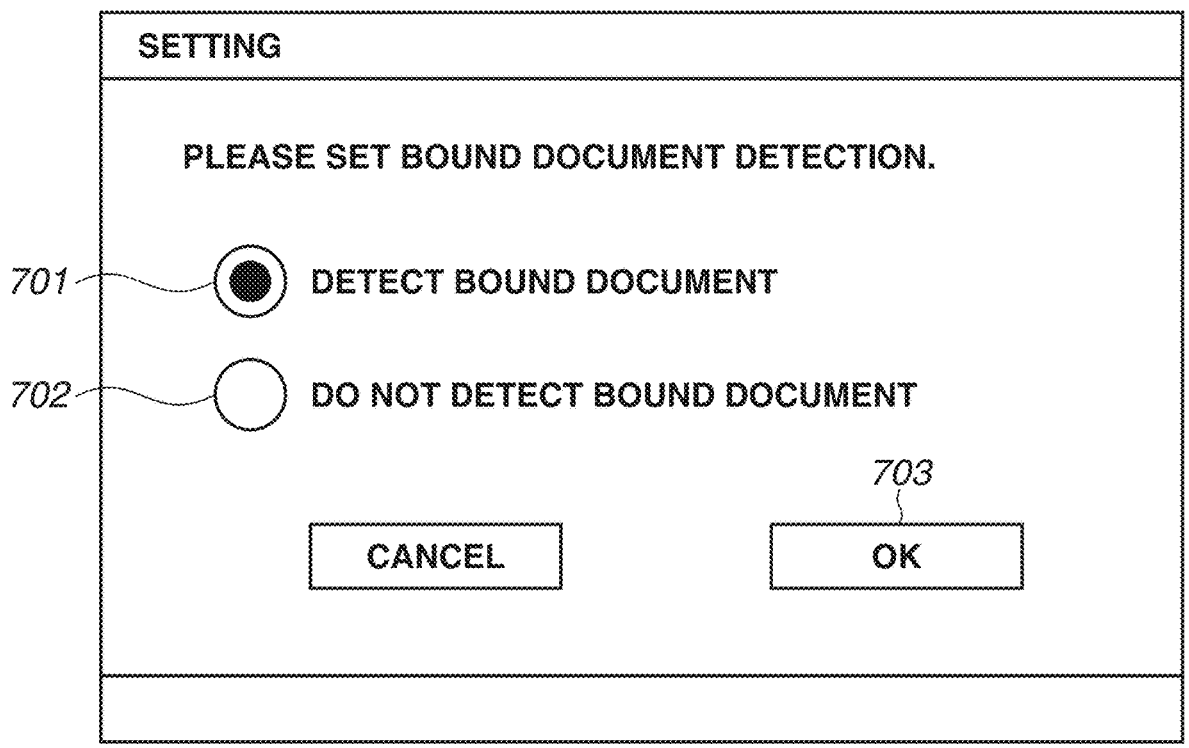
FIG. 6 is a diagram illustrating a UI screen displayed on the LCD touch panel.

FIGS. 5 and 6 are diagrams illustrating user interface (UI) screens displayed on the LCD touch panel 600 illustrated in FIG. 4. The UI screen illustrated in FIG. 5 is an example of a copy screen.

As illustrated in FIG. 5, a select color button 651, a magnification button 652, and a select sheet button 653 for making the respective settings as basic settings are placed. The states of these settings are displayed in an area 650. Settings other than the basic settings can be selected by pressing an other functions button 658. Although not illustrated here, various functions such as page printing, page aggregate, and bookbinding are prepared for the other functions button 658. For functions frequently used by the user among these functions, shortcut buttons can be created on the copy screen. In this case, a two-sided button 654 for setting two-sided printing, and a density button 655 for setting printing density are placed.

Further, a mixed document sizes button 656 for reading documents in which different sizes are mixed together, and a bound document detection button 657 for detecting whether the document S conveyed by the ADF 100 is a document having an unusual shape are placed.

The UI screen illustrated in FIG. 6 is a bound document detection setting screen displayed on the LCD touch panel 600 when the bound document detection button 657 as a shortcut button is pressed.

In FIG. 6, a button 701 is used to enable a bound document detection mode for detecting whether the document S conveyed by the ADF 100 in a copy job is a document having an unusual shape. If an OK button 703 is pressed, data indicating whether the bound document detection mode is enabled or disabled is saved in the RAM 406. On the other hand, a button 702 is used to disable the bound document detection mode for detecting whether the document S conveyed by the ADF 100 in a copy job is a document having an unusual shape. In a case where the bound document detection mode is enabled, a job in which a document having an unusual shape is being conveyed according to detection suspends scanning.

Figure 7:
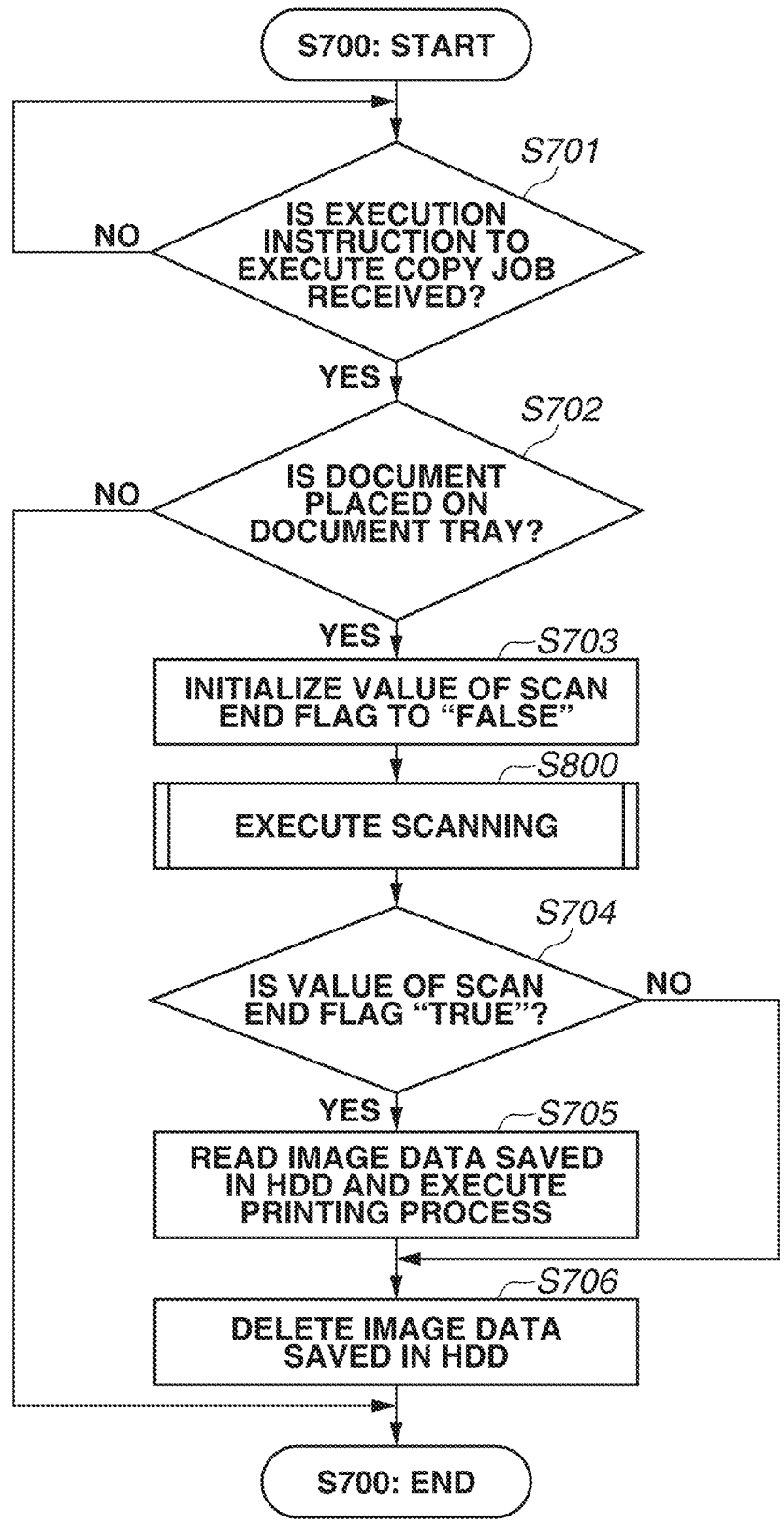
FIG. 7 is a flowchart illustrating a control method for controlling an image reading apparatus.

FIG. 7 is a flowchart illustrating a control method for controlling an image reading apparatus according to the present exemplary embodiment. A process illustrated in each step is achieved by the CPU 401 of the controller unit 400 executing a control program read from the ROM 407 and loaded into the RAM 406. A series of processes regarding FIG. 7 is started in the state where the copy screen illustrated in FIG. 5 is displayed on the LCD touch panel 600, and bound document detection is set to "detect".

In step S701, the CPU 401 determines whether an execution instruction to execute a copy job is received. If it is determined that an execution instruction is received (YES in step S701), the processing proceeds to step S702. If, on the other hand, the determination is NO in step S701 (NO in step S701), the process of step S701 is repeated until it is determined that an execution instruction is received. According to the fact that the start key 607 is pressed by the user in the state where the copy screen illustrated in FIG. 5 is displayed on the LCD touch panel 600, an execution instruction to execute a copy job is received.

In step S702, the CPU 401 determines whether the document S is placed on the document tray 30. By receiving a detection signal from the document detection sensor 23, the CPU 401 can determine that the document S is placed on the document tray 30.

If it is determined in step S702 that the document S is placed on the document tray 30 (YES in step S702), the processing proceeds to step S703. If, on the other hand, the determination is NO in step S702 (NO in step S702), the series of processes regarding FIG. 7 ends.

In step S703, the CPU 401 sets (initializes) the value of a flag indicating whether a series of processes regarding the reading (scanning) of an image of the document S normally ends (hereinafter referred to as a "scan end flag"), to "false". The value of the scan end flag is stored in the RAM 406.

If the value of the scan end flag is "true", it is indicated that the scanning normally ends. If, on the other hand, the value of the scan end flag is "false", it is indicated that the scanning does not normally end.

For example, in a case where a stop instruction to stop the scanning is received, or in a case where the execution of the copy job is canceled, the CPU 401 determines that the scanning does not normally end. Then, the CPU 401 overwrites the value of the scan end flag with "false".

After the process of step S703 is executed, the processing proceeds to step S800. The details of a scanning process in step S800 will be described below.

Next, in step S704 in FIG. 7, the CPU 401 references the value of the scan end flag stored in the RAM 406 and determines whether the value of the scan end flag is "true". If it is determined that the value of the scan end flag is "true" (YES in step S704), the processing proceeds to step S705. If, on the other hand, the determination is NO in step S704 (NO in step S704), the processing proceeds to step S706.

In step S705, the CPU 401 reads image data of the document S saved in the HDD 409 in step S808 described below and temporarily stores the image data in the RAM 406. Then, in step S705, based on the image data of the document S temporarily stored in the RAM 406, the CPU 401 instructs the image forming unit 500 to execute a printing process.

After the process of step S705 is executed, the processing proceeds to step S706. In step S706, the CPU 401 deletes the image data of the document S saved in the HDD 409 in step S808, and the series of processes regarding FIG. 7 ends. This is the details of a series of processes of receiving an execution instruction to execute a copy job and executing the copy job for which the execution instruction is received.

[Series of Processes Regarding Scanning]

Figure 8:
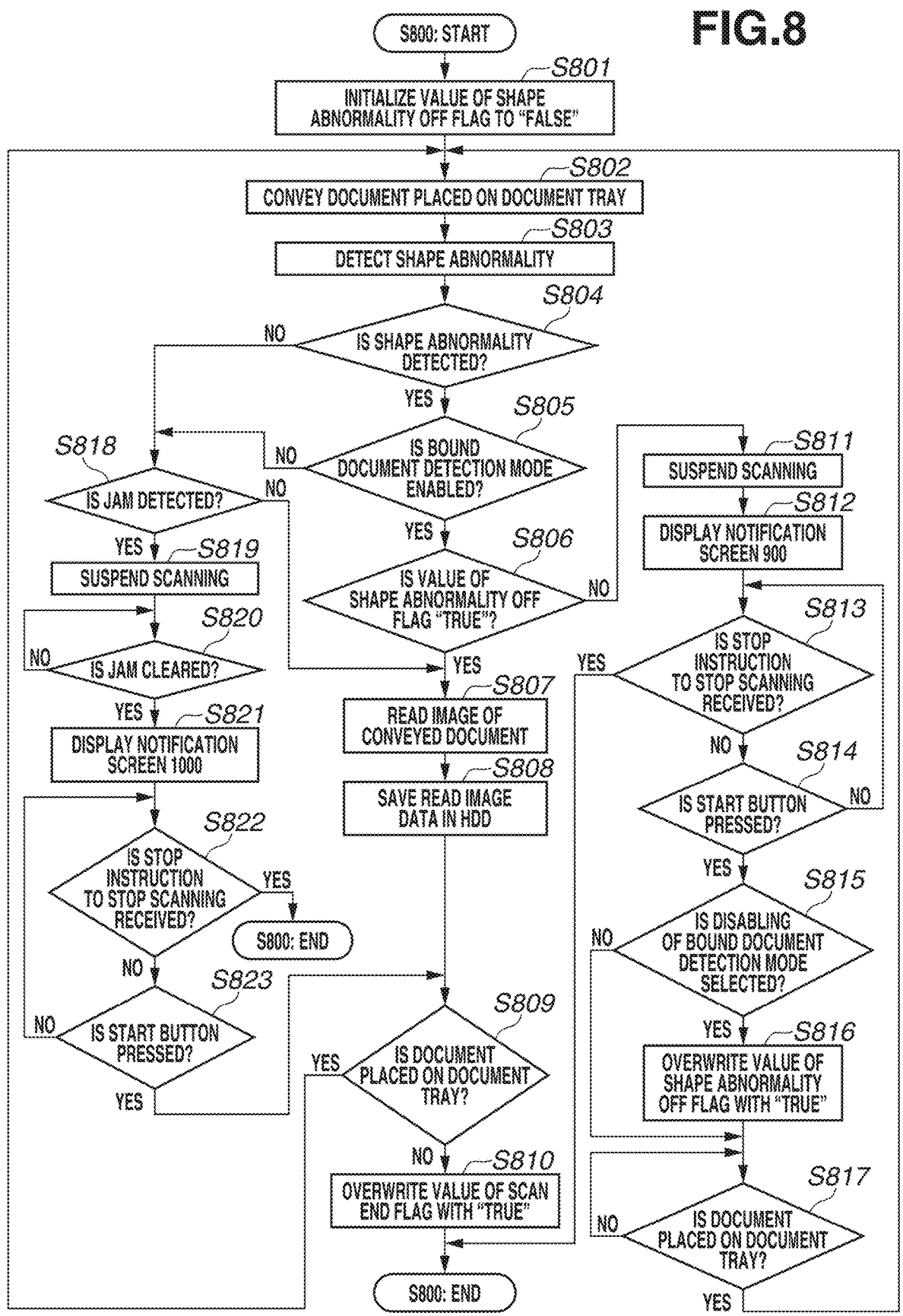
FIG. 8 is a flowchart illustrating the control method for controlling the image reading apparatus.

FIG. 8 is a flowchart illustrating the control method for controlling the image reading apparatus according to the present exemplary embodiment. This example corresponds to the detailed procedure of a series of processes regarding scanning (step S800) performed by the CPU 401. A process illustrated in each step is achieved by the CPU 401 of the controller unit 400 executing a control program read from the ROM 407 and loaded into the RAM 406.

In step S801, the CPU 401 sets (initializes) the value of an unusual shape off flag to "false", and the processing proceeds to step S802. The unusual shape off flag refers to a flag that, in a case where it is determined that the document S has an unusual shape according to a change in the distance from the top surface of the document S measured by the distance measurement sensor 22, indicates whether to continue the scanning until the scanning ends. The value of the unusual shape off flag is stored in the RAM 406. If the value of the unusual shape off flag is "true", and even if an unusual shape is detected in the document S, the scanning is continued until the scanning ends. If, on the other hand, the value of the unusual shape off flag is "false", then according to the fact that an unusual shape is detected in the document S, the scanning is suspended.

After the process of step S801 is executed, the processing proceeds to step S802. In step S802, the CPU 401 instructs a control unit (the CPU 321) of the image reading unit 200 to convey the document S placed on the document tray 30.

After the process of step S802 is executed, the processing proceeds to step S803. In step S803, the CPU 401 instructs the control unit (the CPU 321) of the image reading unit 200 to detect whether the shape of the document S conveyed in step S802 is unusual. In step S803, the control unit (the CPU 321) of the image reading unit 200 detects an unusual shape in the document S and notifies the CPU 401 of the detection result.

After the process of step S803 is executed, the processing proceeds to step S804. If an unusual shape is detected (YES in step S804), the processing proceeds to step S805. If, on the other hand, the determination is NO in step S804 (NO in step S804), the processing proceeds to step S818.

In step S805, the CPU 401 references setting information stored in the RAM 406 and determines whether the bound document detection mode is enabled. If it is determined that the bound document detection mode is enabled (YES in step S805), the processing proceeds to step S806. If, on the other hand, it is determined in step S805 that the bound document detection mode is disabled (NO in step S805), the processing proceeds to step S818.

In step S806, the CPU 401 references the value of the unusual shape off flag stored in the RAM 406. If it is determined that the value of the unusual shape off flag is not "true" (NO in step S806), the processing proceeds to step S811.

If, on the other hand, the determination is YES in step S806 (YES in step S806), the processing proceeds to step S807. In step S807, the CPU 401 instructs the control unit (the CPU 321) of the image reading unit 200 to read an image of the conveyed document S.

After the process of step S807 is executed, the processing proceeds to step S808. In step S808, the CPU 401 instructs the control unit (the CPU 321) of the image reading unit 200 to transfer the read image data to the controller unit 400. Then, the CPU 401 stores in the HDD 409 the image data of the document S transferred to the controller unit 400.

After the process of step S808 is executed, the processing proceeds to step S809. In step S809, the CPU 401 determines whether the document S is placed on the document tray 30. If it is determined that the document S is placed on the document tray 30 (YES in step S809), the processing proceeds to step S802. If, on the other hand, the determination is NO in step S809 (NO in step S809), the processing proceeds to step S810.

In step S810, the CPU 401 overwrites the value of the scan end flag stored in the RAM 406 with "true". After the process of step S810 is executed, the series of processes regarding FIG. 8 (step S800) ends, and the processing proceeds to step S704 in FIG. 7.

In step S811, the CPU 401 instructs the control unit (the CPU 321) of the image reading unit 200 to suspend the conveyance of the document S. According to the suspension of the scanning, the CPU 401 causes the CPU 321 to stop the conveyance of the document S and the reading of an image of the document S.

After the process of step S811 is executed, the processing proceeds to step S812. In step S812, the CPU 401 displays on the LCD touch panel 600 a notification screen 900 illustrated in FIG. 9.

Figure 9:
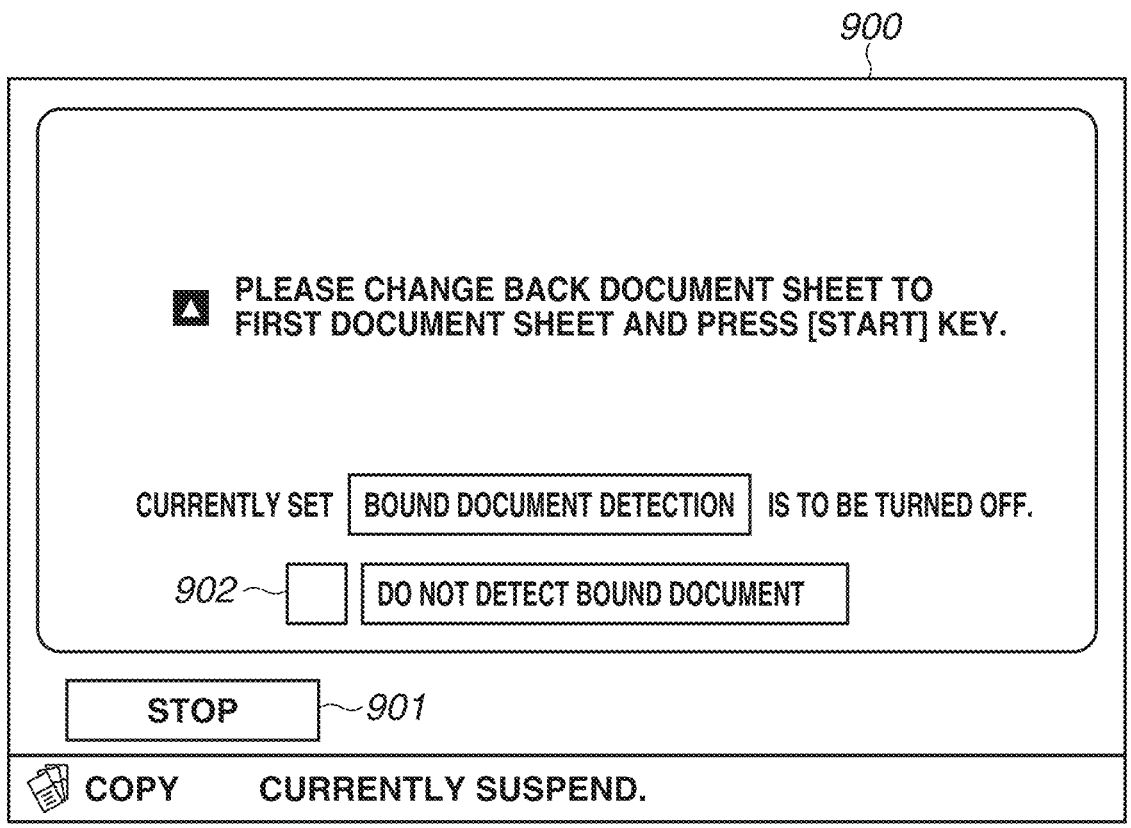
FIG. 9 is a diagram illustrating a UI screen displayed on the LCD touch panel.

The notification screen 900 illustrated in FIG. 9 is a screen for urging the user to place the document S on the document tray 30 of the ADF 100 again. Further, the notification screen 900 is a screen for urging the user to continue the scanning until the scanning ends even if an unusual shape is detected in the document S. The CPU 401 displays, as a screen for receiving an instruction not to detect a bound document, the notification screen 900 on the LCD touch panel 600.

After the process of step S812 is executed, the processing proceeds to step S813. In step S813, the CPU 401 determines whether a stop instruction to stop the scanning is received. For example, according to the fact that a stop button 901 on the notification screen 900 is pressed by the user, the CPU 401 determines that a stop instruction to stop the scanning is received. If it is determined that a stop instruction to stop the scanning is received (YES in step S813), the series of processes regarding FIG. 8 (step S800) ends, and the processing proceeds to step S704 in FIG. 7. If, on the other hand, the determination is NO in step S813 (NO in step S813), the processing proceeds to step S814.

In step S814, the CPU 401 determines whether a resumption instruction to resume the scanning is received. For example, according to the fact that the start key 607 on the operation unit 405 is pressed by the user, the CPU 401 determines that a resumption instruction to resume the scanning is received.

If it is determined that a resumption instruction to resume the scanning is received (YES in step S814), the processing proceeds to step S815. If, on the other hand, the determination is NO in step S814 (NO in step S814), the processing returns to step S813.

In step S815, the CPU 401 determines whether a bound document detection off button 902 on the notification screen 900 illustrated in FIG. 9 is pressed. If it is determined that the bound document detection off button 902 is pressed (YES in step S815), the processing proceeds to step S816. Meanwhile, in step S815, the CPU 401 determines whether the user makes a selection to temporarily turn off the bound document detection mode.

For example, if the document detection off button 902 on the notification screen 900 illustrated in FIG. 9 is pressed, the CPU 401 determines that the user makes a selection to temporarily turn off the bound document detection mode. If it is determined that the user makes a selection to temporarily turn off the bound document detection mode (YES in step S815), the processing proceeds to step S816. If, on the other hand, the determination is NO in step S815 (NO in step S815), the processing proceeds to step S817.

In step S816, the CPU 401 overwrites the value of the unusual shape off flag stored in the RAM 406 with "true".

After the process of step S816 is executed, the processing proceeds to step S817.

In step S817, the CPU 401 determines whether the document S is placed on the document tray 30. If it is determined that the document S is placed on the document tray 30 (YES in step S817), the processing proceeds to step S802.

If, on the other hand, the determination is NO in step S817 (NO in step S817), the process of step S817 is repeated until it is determined that the document S is placed on the document tray 30.

In step S818, the CPU 401 determines whether a paper jam occurs in the ADF 100. For example, if the separation sensor 24 cannot detect the document S even after the certain time (t1) elapses from the start of the conveyance, the CPU 321 of the image reading unit 200 determines that a jam occurs.

Then, the CPU 321 notifies the CPU 401 of the controller unit 400 of the occurrence of the jam. The CPU 401 notified of the occurrence of the jam determines that a paper jam occurs. If it is determined that a paper jam occurs in the ADF 100 (YES in step S818), the processing proceeds to step S819. If, on the other hand, the determination is NO in step S818 (NO in step S818), the processing proceeds to step S807.

In step S819, the CPU 401 instructs the control unit (the CPU 321) of the image reading unit 200 to suspend the conveyance of the document S. According to the suspension of the scanning, the CPU 401 causes the CPU 321 to stop the conveyance of the document S and the reading of an image of the document S.

After the process of step S819 is executed, the processing proceeds to step S820. In step S820, the CPU 401 determines whether the paper jam occurring in the ADF 100 is cleared. For example, the CPU 321 of the image reading unit 200 confirms the values of the various sensors 304 notified by the CPU 300 of the ADF 100. If the document S is not detected after (downstream of) the separation sensor 24, the CPU 401 determines that the jam is cleared.

Then, the CPU 321 notifies the CPU 401 of the controller unit 400 of the clearing of the jam. The CPU 401 notified of the clearing of the jam determines that the paper jam is cleared. If it is determined that the paper jam is cleared in the ADF 100 (YES in step S820), the processing proceeds to step S821. If, on the other hand, the determination is NO in step S820 (NO in step S820), the process of step S820 is repeated.

Figure 10:
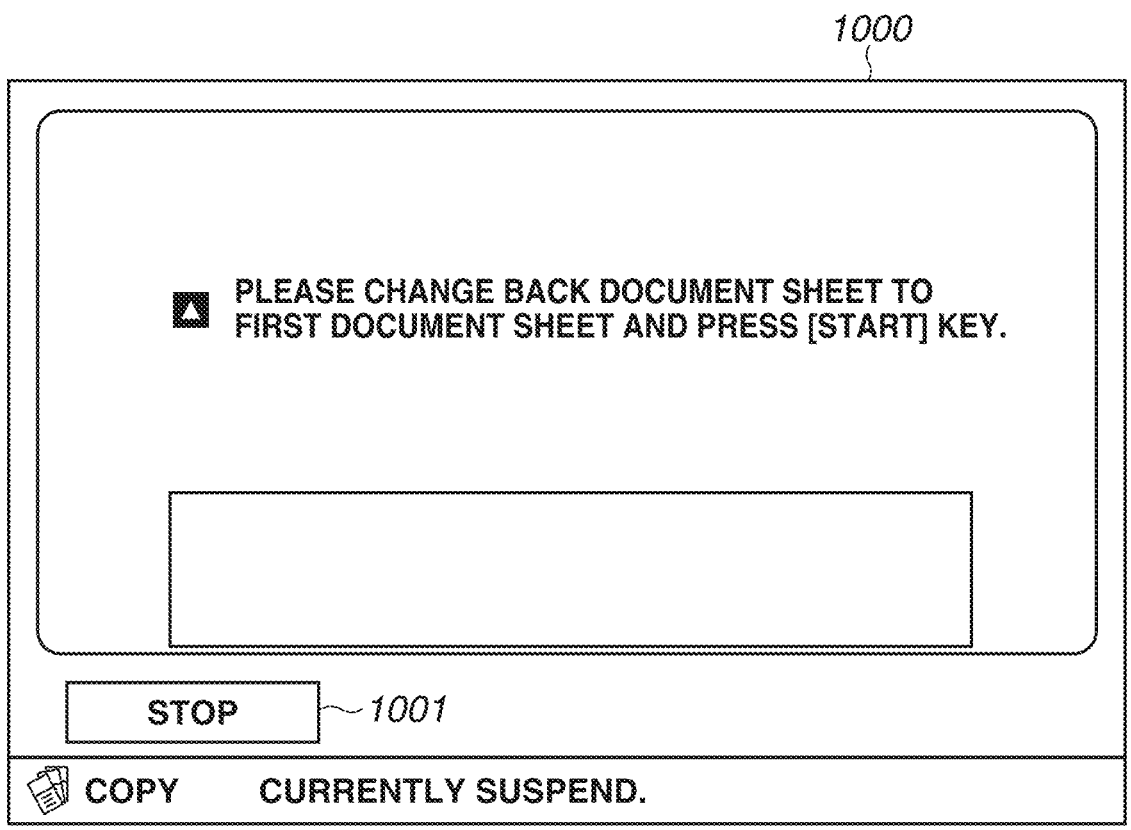
FIG. 10 is a diagram illustrating a UI screen displayed on the LCD touch panel.

In step S821, the CPU 401 displays on the LCD touch panel 600 a notification screen 1000 illustrated in FIG. 10. The notification screen 1000 illustrated in FIG. 10 is a screen for urging the user to place the document S on the document tray 30 again.

After the process of step S821 is executed, the processing proceeds to step S822. In step S822, the CPU 401 determines whether a stop instruction to stop the scanning is received. For example, according to the fact that a stop button 1001 on the notification screen 1000 is pressed by the user, the CPU 401 determines that a stop instruction to stop the scanning is received. If it is determined that a stop instruction to stop the scanning is received (YES in step S822), the series of processes regarding FIG. 8 (step S800) ends, and the processing proceeds to step S704 in FIG. 7. If, on the other hand, the determination is NO in step S822 (NO in step S822), the processing proceeds to step S823.

In step S823, the CPU 401 determines whether a resumption instruction to resume the scanning is received. For example, according to the fact that the start key 607 on the operation unit 405 is pressed by the user, the CPU 401 determines that a resumption instruction to resume the scanning is received.

If it is determined that a resumption instruction to resume the scanning is received (YES in step S823), the processing proceeds to step S809. If, on the other hand, the determination is NO in step S823 (NO in step S823), the processing returns to step S822. This is the details of the series of processes regarding scanning (step S800).

According to the first exemplary embodiment, in a case where the fact that the shape state of a document to be conveyed is not normal is caused by the state of the document, it is possible to receive from a user an instruction to read the document, without detecting whether the above shape state is an unusual shape in the document.

In a second exemplary embodiment, the following example is described. First, after the fact that a document is a stapled document is presented to the user, the user manually places the detected document on the document platen without using the ADF 100. Then, an instruction to switch to a continuous reading process, in which the user repeatedly gives an instruction by pressing the start button 607, can be received.

Figure 11:
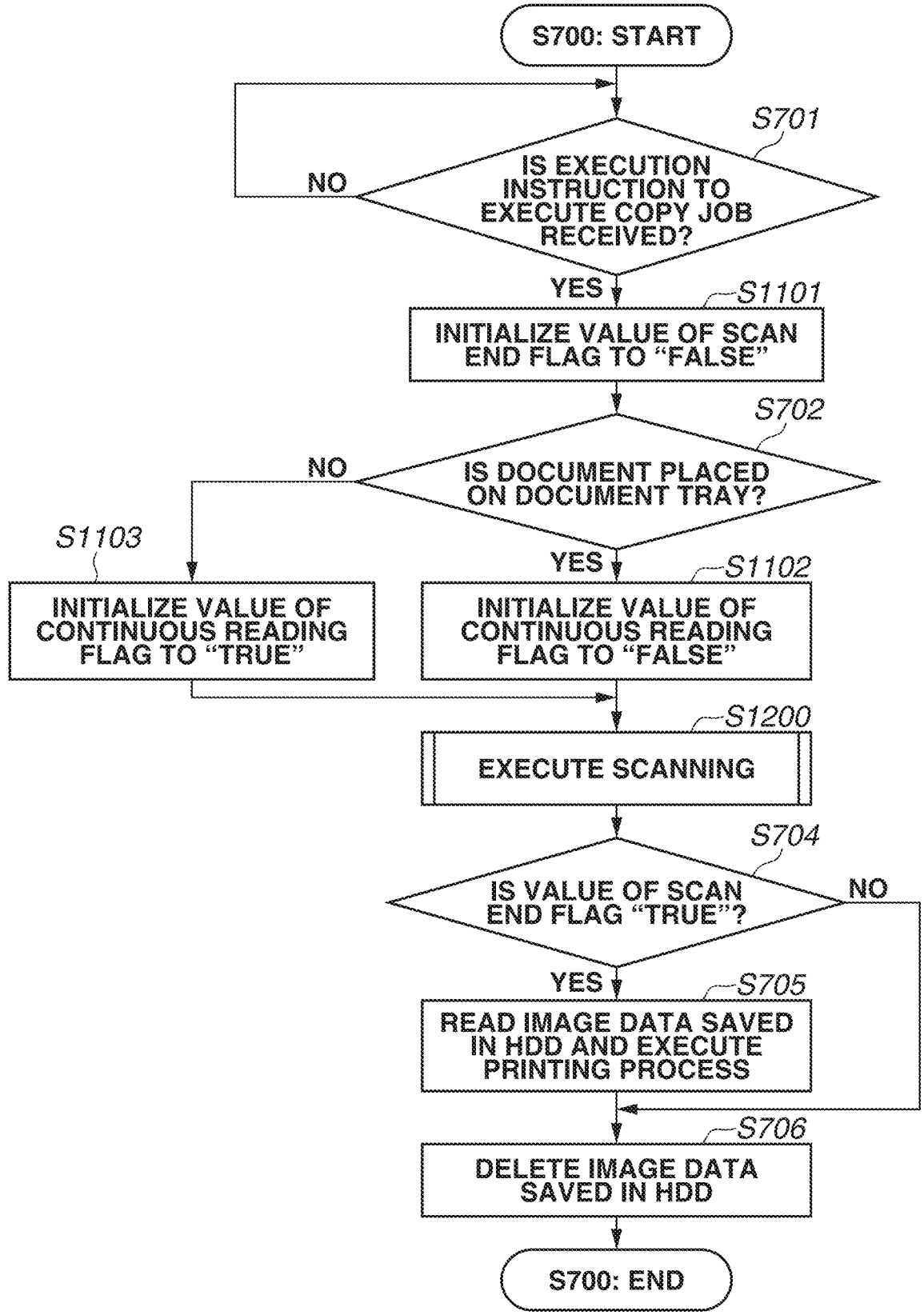
FIG. 11 is a flowchart illustrating a control method for controlling an image reading apparatus.

FIG. 11 is a flowchart illustrating a control method for controlling an image reading apparatus according to the present exemplary embodiment. A process illustrated in each step is achieved by the CPU 401 of the controller unit 400 executing a control program read from the ROM 407 and loaded into the RAM 406. A series of processes regarding FIG. 11 is started in the state where the copy screen illustrated in FIG. 5 is displayed on the LCD touch panel 600, and bound document detection is set to "detect". Steps similar to those in FIG. 7 are designated by the same step numbers.

In step S701, the CPU 401 determines whether an execution instruction to execute a copy job is received. If it is determined that an execution instruction is received (YES in step S701), the processing proceeds to step S1101. If, on the other hand, the determination is NO in step S701 (NO in step S701), the process of step S701 is repeated until it is determined that an execution instruction is received. According to the fact that the start key 607 is pressed by the user in the state where the copy screen illustrated in FIG. 5 is displayed on the LCD touch panel 600, an execution instruction to execute a copy job is received.

In step S1101, the CPU 401 sets (initializes) the value of a flag indicating whether a series of processes regarding the reading (scanning) of an image of the document S normally ends (hereinafter referred to as a "scan end flag"), to "false". The value of the scan end flag is stored in the RAM 406.

If the value of the scan end flag is "true", it is indicated that the scanning normally ends. If, on the other hand, the value of the scan end flag is "false", it is indicated that the scanning does not normally end. For example, in a case where a stop instruction to stop the scanning is received, or in a case where the execution of the copy job is canceled, the CPU 401 determines that the scanning does not normally end. Then, the CPU 401 overwrites the value of the scan end flag with "false".

In step S702, the CPU 401 determines whether the document S is placed on the document tray 30. By receiving a detection signal from the document detection sensor 23, the CPU 401 can determine that the document S is placed on the document tray 30.

If it is determined in step S702 that the document S is placed on the document tray 30 (YES in step S702), the processing proceeds to step S1102. If, on the other hand, the determination is NO in step S702 (NO in step S702), the processing proceeds to step S1103.

In step S1102, the CPU 401 sets (initializes) the value of a flag indicating whether to repeat the reading of a document multiple times by the process of reading a document on the document platen, the process of reading a document using the ADF 100, and the combination of these processes (hereinafter referred to as a "continuous reading flag"), to "false". The value of the continuous reading flag is stored in the RAM 406. After the process of step S1102 is executed, the processing proceeds to step S1200.

In step S1103, the CPU 401 sets the value of the continuous reading flag to "true", and the processing proceeds to step S1200. The details of the process of step S1200 will be described below with reference to FIGS. 12A and 12B.

Next, in step S704 in FIG. 11, the CPU 401 references the value of the scan end flag stored in the RAM 406 and determines whether the value of the scan end flag is "true". If it is determined in step S704 that the value of the scan end flag is "true" (YES in step S704), the processing proceeds to step S705. If, on the other hand, the determination is NO in step S704 (NO in step S704), the processing proceeds to step S706.

In step S705, the CPU 401 reads image data of the document S saved in the HDD 409 in step S1219 or S1224 described below and temporarily stores the image data in the RAM 406. Then, based on the image data of the document S temporarily stored in the RAM 406, the CPU 401 instructs the image forming unit 500 to execute a printing process.

After the process of step S705 is executed, the processing proceeds to step S706. In step S706, the CPU 401 deletes the image data of the document S saved in the HDD 409 in step S1219 or S1224, and the series of processes regarding FIG. 11 ends. This is the details of a series of processes of receiving an execution instruction to execute a copy job and executing the copy job for which the execution instruction is received.

[Series of Processes Regarding Scanning]

Figure 12:
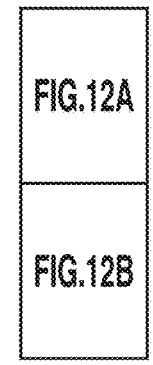
FIG. 12 includes FIGS. 12A and 12B that show flowcharts illustrating the control method for controlling the image reading apparatus.
Figure 12A:
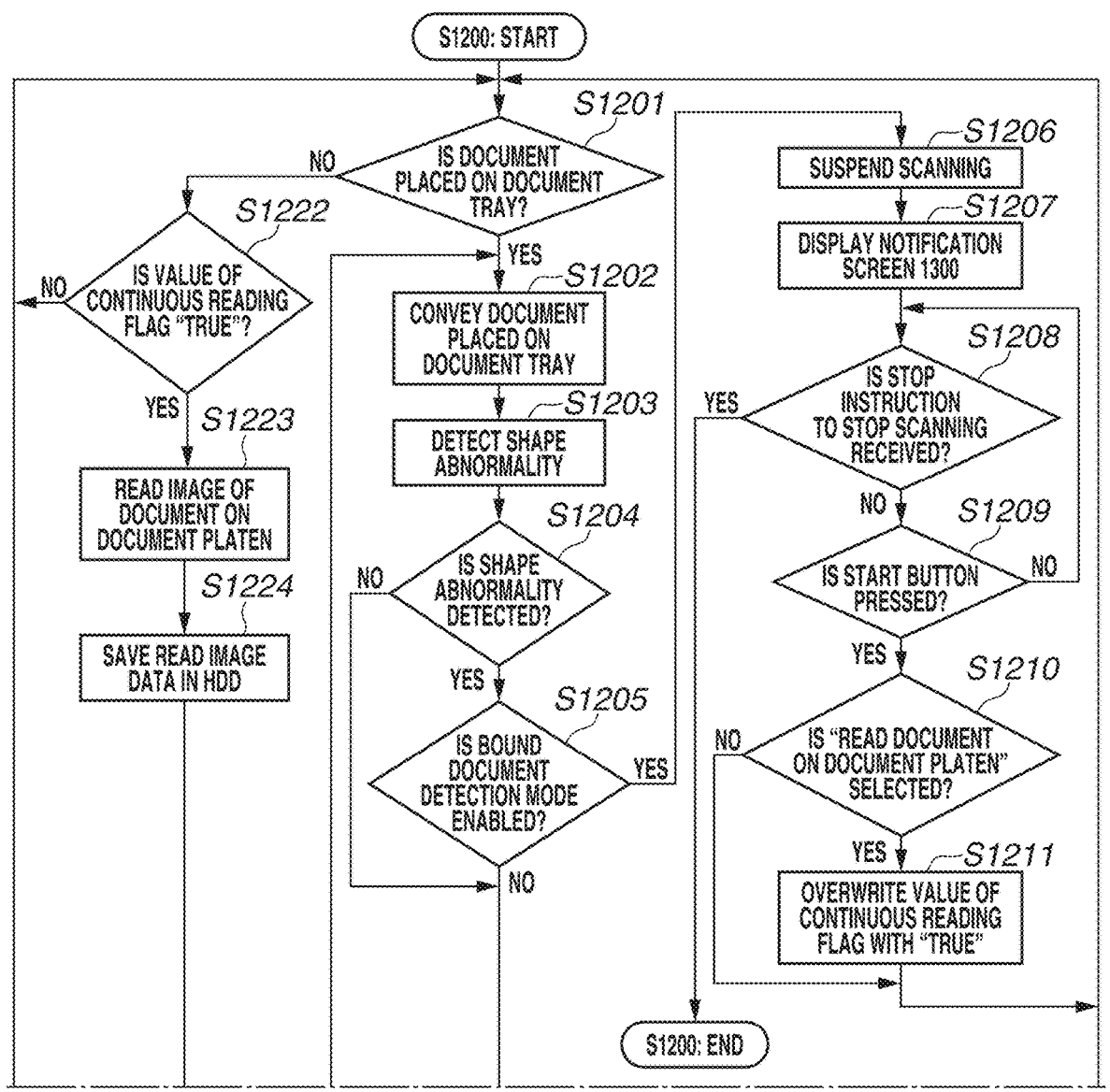
Figure 12B:
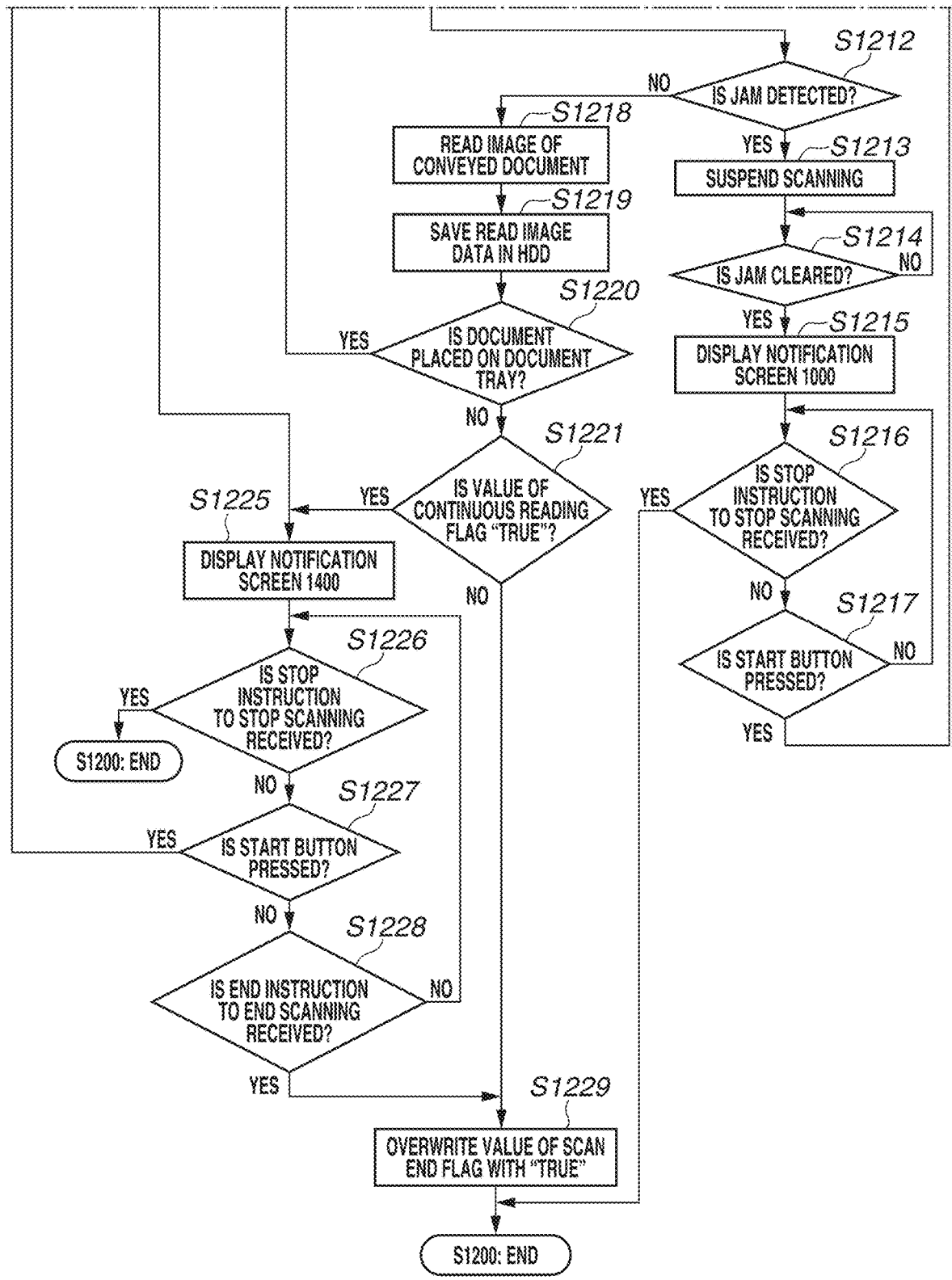

FIGS. 12A and 12B are a flowchart illustrating the control method for controlling the image reading apparatus according to the present exemplary embodiment. This example corresponds to the detailed procedure of a series of processes regarding scanning (step S1200) performed by the CPU 401. A process illustrated in each step is achieved by the CPU 401 of the controller unit 400 executing a control program read from the ROM 407 and loaded into the RAM 406.

In step S1201, the CPU 401 determines whether the document S is placed on the document tray 30. If it is determined that the document S is placed on the document tray 30 (YES in step S1201), the processing proceeds to step S1202. If, on the other hand, the determination is NO in step S1201 (NO in step S1201), the processing proceeds to step S1222.

In step S1202, the CPU 401 instructs the control unit (the CPU 321) of the image reading unit 200 to convey the document S placed on the document tray 30. After the process of step S1202 is executed, the processing proceeds to step S1203. In step S1203, the CPU 401 instructs the control unit (the CPU 321) of the image reading unit 200 to detect whether the shape of the document S conveyed in step S1202 is unusual. In step S1203, the control unit (the CPU 321) of the image reading unit 200 detects an unusual shape in the document S and notifies the CPU 401 of the detection result.

After the process of step S1203 is executed, the processing proceeds to step S1204. If an unusual shape is detected (YES in step S1204), the processing proceeds to step S1205. If, on the other hand, the determination is NO in step S1204 (NO in step S1204), the processing proceeds to step S1212.

In step S1205, the CPU 401 references setting information stored in the RAM 406 and determines whether the bound document detection mode is enabled. If it is determined that the bound document detection mode is enabled (YES in step S1205), the processing proceeds to step S1206. If, on the other hand, it is determined in step S1205 that the bound document detection mode is disabled (NO in step S1205), the processing proceeds to step S1212.

In step S1206, the CPU 401 instructs the control unit (the CPU 321) of the image reading unit 200 to suspend the conveyance of the document S. According to the suspension of the scanning, the CPU 401 causes the CPU 321 to stop the conveyance of the document S and the reading of an image of the document S.

Figure 13:
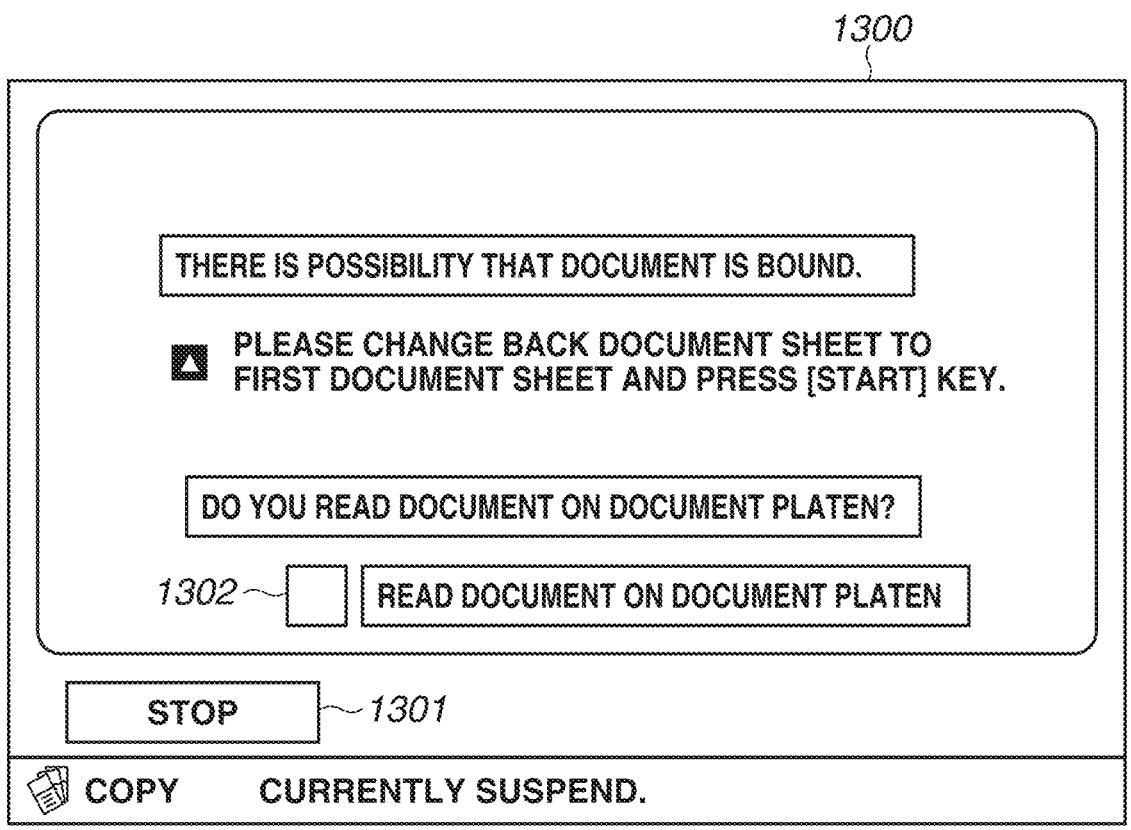
FIG. 13 is a diagram illustrating a UI screen displayed on an LCD touch panel.

After the process of step S1206 is executed, the processing proceeds to step S1207. In step S1207, the CPU 401 displays on the LCD touch panel 600 a notification screen 1300 illustrated in FIG. 13. The notification screen 1300 illustrated in FIG. 13 is a screen for urging the user to place the document S on the document tray 30 again. Further, the notification screen 1300 is a screen for confirming with the user about whether to read the document S on the document platen to continue the scanning if an unusual shape is detected in the document S. The notification screen 1300 is displayed as a screen for receiving a switch instruction to switch a first reading process for reading a document conveyed by the ADF 100 to a second reading process for continuously reading a document placed on the document platen.

After the process of step S1207 is executed, the processing proceeds to step S1208. In step S1208, the CPU 401 determines whether a stop instruction to stop the scanning is received. For example, according to the fact that a stop button 1301 on the notification screen 1300 is pressed by the user, the CPU 401 determines that a stop instruction to stop the scanning is received. If it is determined that a stop instruction to stop the scanning is received (YES in step S1208), the series of processes regarding FIGS. 12A and 12B (step S1200) ends, and the processing proceeds to step S704 in FIG. 11. If, on the other hand, the determination is NO in step S1208 (NO in step S1208), the processing proceeds to step S1209.

In step S1209, the CPU 401 determines whether a resumption instruction to resume the scanning is received. For example, according to the fact that the start key 607 on the operation unit 405 is pressed by the user, the CPU 401 determines that a resumption instruction to resume the scanning is received.

If it is determined that a resumption instruction to resume the scanning is received (YES in step S1209), the processing proceeds to step S1210. If, on the other hand, the determination is NO in step S1209 (NO in step S1209), the processing returns to step S1208.

In step S1210, the CPU 401 determines whether a "read document on document platen" button 1302 on the notification screen 1300 illustrated in FIG. 13 is pressed. If it is determined that the "read document on document platen" button 1302 is pressed (YES in step S1210), the processing proceeds to step S1211. If, on the other hand, the determination is NO in step S1210 (NO in step S1210), the processing returns to step S1201.

In step S1211, the CPU 401 overwrites the value of the continuous reading flag stored in the RAM 406 with "true", and the processing returns to step S1201.

In step S1212, the CPU 401 determines whether a paper jam occurs in the ADF 100. For example, if the separation sensor 24 cannot detect the document S even after the certain time (t1) elapses from the start of the conveyance, the CPU 321 of the image reading unit 200 determines that a jam occurs.

Then, the CPU 321 notifies the CPU 401 of the controller unit 400 of the occurrence of the jam. The CPU 401 notified of the occurrence of the jam determines that a paper jam occurs. If it is determined that a paper jam occurs in the ADF 100 (YES in step S1212), the processing proceeds to step S1213. If, on the other hand, the determination is NO in step S1212 (NO in step S1212), the processing proceeds to step S1218.

In step S1213, the CPU 401 instructs the control unit (the CPU 321) of the image reading unit 200 to suspend the conveyance of the document S. According to the suspension of the scanning, the CPU 401 causes the CPU 321 to stop the conveyance of the document S and the reading of an image of the document S.

After the process of step S1213 is executed, the processing proceeds to step S1214. In step S1214, the CPU 401 determines whether the paper jam occurring in the ADF 100 is cleared. For example, the CPU 321 of the image reading unit 200 confirms the values of the various sensors 304 notified by the CPU 300 of the ADF 100. If the document S is not detected after (downstream of) the separation sensor 24, the CPU 401 determines that the jam is cleared.

Then, the CPU 321 notifies the CPU 401 of the controller unit 400 of the clearing of the jam. The CPU 401 notified of the clearing of the jam determines that the paper jam is cleared. If it is determined that the paper jam is cleared in the ADF 100 (YES in step S1214), the processing proceeds to step S1215. If, on the other hand, the determination is NO in step S1214 (NO in step S1214), the process illustrated in step S1214 is repeated.

In step S1215, the CPU 401 displays on the LCD touch panel 600 the notification screen 1000 illustrated in FIG. 10. The notification screen 1000 illustrated in FIG. 10 is a screen for urging the user to place the document S on the document tray 30 again.

After the process of step S1215 is executed, the processing proceeds to step S1216. In step S1216, the CPU 401 determines whether a stop instruction to stop the scanning is received. For example, according to the fact that the stop button 1001 on the notification screen 1000 is pressed by the user, the CPU 401 determines that a stop instruction to stop the scanning is received. If it is determined that a stop instruction to stop the scanning is received (YES in step S1216), the series of processes regarding FIG. 12 (step S1200) ends, and the processing proceeds to step S704 in FIG. 11. If, on the other hand, the determination is NO in step S1216 (NO in step S1216), the processing proceeds to step S1217.

In step S1217, the CPU 401 determines whether a resumption instruction to resume the scanning is received. For example, according to the fact that the start key 607 on the operation unit 405 is pressed by the user, the CPU 401 determines that a resumption instruction to resume the scanning is received.

If it is determined that a resumption instruction to resume the scanning is received (YES in step S1217), the processing returns to step S1201. If, on the other hand, the determination is NO in step S1217 (NO in step S1217), the processing returns to step S1216.

In step S1218, the CPU 401 instructs the control unit (the CPU 321) of the image reading unit 200 to read an image of the conveyed document S.

After the process of step S1218 is executed, the processing proceeds to step S1219. In step S1219, the CPU 401 instructs the control unit (the CPU 321) of the image reading unit 200 to transfer the read image data to the controller unit 400. Then, the CPU 401 stores in the HDD 409 the image data of the document S transferred to the controller unit 400.

After the process of step S1219 is executed, the processing proceeds to step S1220. The CPU 401 determines whether the document S is placed on the document tray 30. If it is determined that the document S is placed on the document tray 30 (YES in step S1220), the processing proceeds to step S1202. If, on the other hand, the determination is NO in step S1220 (NO in step S1220), the processing proceeds to step S1221.

In step S1221, the CPU 401 determines whether the value of the continuous reading flag is "true". If the value of the continuous reading flag is "true" (YES in step S1221), the processing proceeds to step S1225. If, on the other hand, the determination is NO in step S1221 (NO in step S1221), the processing proceeds to step S1229.

In step S1222, the CPU 401 determines whether the value of the continuous reading flag is "true". If the value of the continuous reading flag is "true" (YES in step S1222), the processing proceeds to step S1223. If, on the other hand, the determination is NO in step S1222 (NO in step S1222), the processing returns to step S1201. In step S1223, the CPU 401 instructs the control unit (the CPU 321) of the image reading unit 200 to read an image of the document S on the document platen.

After the process of step S1223 is executed, the processing proceeds to step S1224. In step S1224, the CPU 401 instructs the control unit (the CPU 321) of the image reading unit 200 to transfer the read image data to the controller unit 400. Then, the CPU 401 stores in the HDD 409 the image data of the document S transferred to the controller unit 400.

Figure 14:
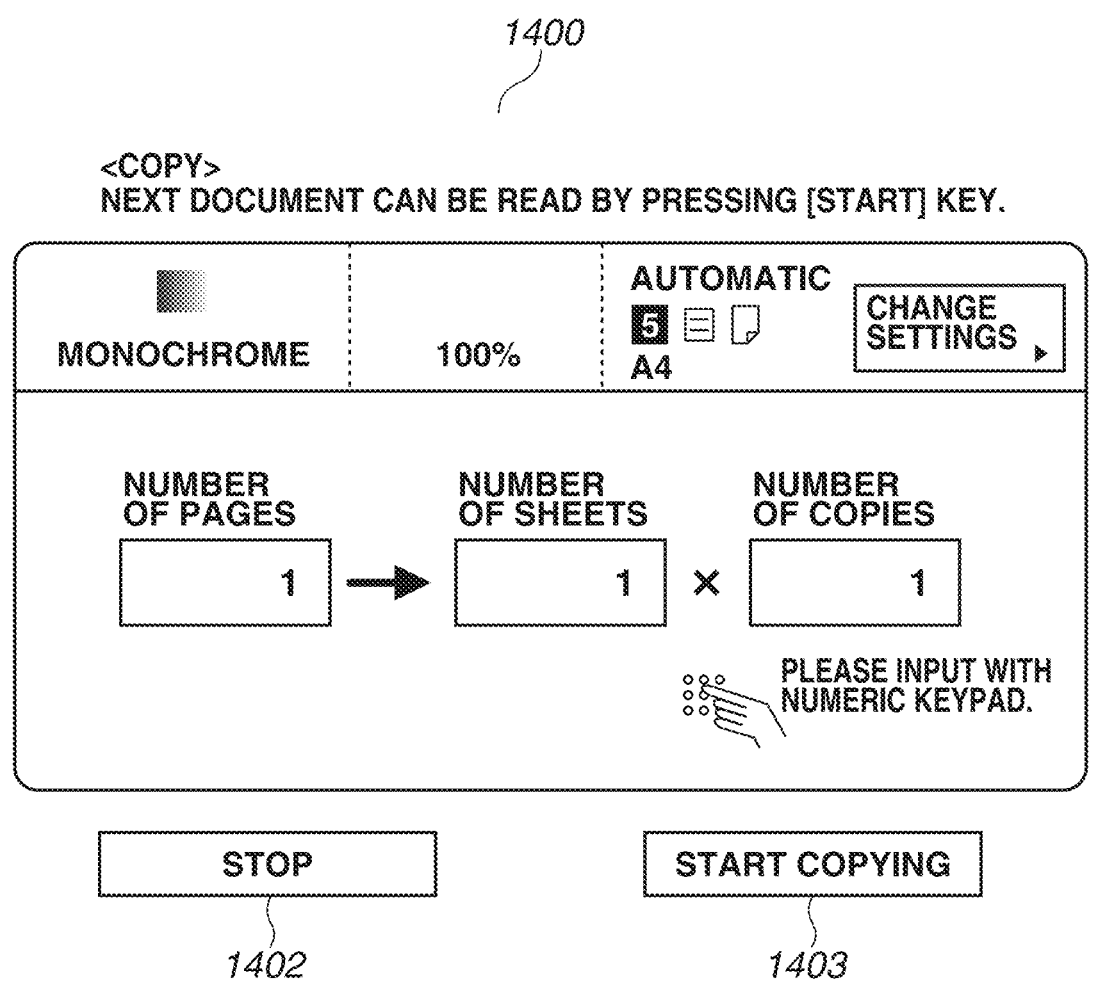
FIG. 14 is a diagram illustrating a UI screen displayed on the LCD touch panel.

After the process of step S1224 is executed, the processing proceeds to step S1225. In step S1225, the CPU 401 displays on the LCD touch panel 600 a notification screen 1400 illustrated in FIG. 14. The notification screen 1400 illustrated in FIG. 14 is a screen for allowing the user to select whether to read a next document.

After the process of step S1225 is executed, the processing proceeds to step S1226. In step S1226, the CPU 401 determines whether a stop instruction to stop the scanning is received. For example, according to the fact that a stop button 1402 on the notification screen 1400 is pressed by the user, the CPU 401 determines that a stop instruction to stop the scanning is received. If it is determined that a stop instruction to stop the scanning is received (YES in step S1226), the series of processes regarding FIG. 12 (step S1200) ends, and the processing proceeds to step S704 in FIG. 11. If, on the other hand, the determination is NO in step S1226 (NO in step S1226), the processing proceeds to step S1227.

In step S1227, the CPU 401 determines whether a reading instruction to read a next document is received. For example, according to the fact that the start key 607 on the operation unit 405 is pressed by the user, the CPU 401 determines that a reading instruction to read a next document is received.

If it is determined that a reading instruction to read a next document is received (YES in step S1227), the processing returns to step S1201. If, on the other hand, the determination is NO in step S1227 (NO in step S1227), the processing proceeds to step S1228.

In step S1228, the CPU 401 determines whether an end instruction to end the scanning is received. For example, according to the fact that a start copying button 1403 on a notification screen 1400 is pressed by the user, the CPU 401 determines that an end instruction to end the scanning is received.

If it is determined that an end instruction to end the scanning is received (YES in step S1228), the processing proceeds to step S1229. If, on the other hand, the determination is NO in step S1228 (NO in step S1228), the processing returns to step S1226.

In step S1229, the CPU 401 overwrites the value of the scan end flag stored in the RAM 406 with "true". After the process of step S1229 is executed, the series of processes regarding FIG. 12 (step S1200) ends, and the processing proceeds to step S704 in FIG. 11. This is the details of the series of processes regarding scanning (step S1200).

According to the second exemplary embodiment, it is possible to present the cause of the suspension of a job to a user and entrust the user with selecting whether to give an instruction to switch a recovery process for recovering the job to a continuous reading process, which is manually performed by the user.

That is, in a case where the fact that the shape state of a document to be conveyed is not normal is caused by binding such as stapling, it is possible to present the cause of this shape state and also receive from a user an instruction to continuously read a document placed on a document platen.

The present invention can also be achieved by the process of supplying a program for achieving one or more functions of the above exemplary embodiments to a system or an apparatus via a network or a storage medium, and of causing one or more processors of a computer of the system or the apparatus to read and execute the program. Alternatively, the present invention can also be achieved by a circuit (e.g., an application-specific integrated circuit (ASIC)) for achieving the one or more functions. Specifically, the present invention can be achieved by a control circuit (an ASIC), designed to execute the processing based on the flowcharts, executing the processing of the CPU 300, the CPU 321, and the CPU 401.

According to the present invention, in a case where the fact that the shape state of a document to be conveyed is not normal is caused by the state of the document, it is possible to receive from a user an instruction to read the document, without detecting whether the above shape state is an unusual shape in the document.

Further, in a case where the fact that the shape state of a document to be conveyed is not normal is caused by binding such as stapling, it is possible to present the cause of this shape state and also receive from a user an instruction to continuously read a document placed on a document platen.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image reading apparatus comprising:
   a display;
   a conveyor that conveys a document sheet;
   a reader that reads an image on the document sheet conveyed by the conveyor; and
   a controller that determines whether stapled document sheets are conveyed by the conveyor, based on a conveyance state of document sheets conveyed by the conveyor,
   wherein the controller further detects occurrence of a jam of document sheets conveyed by the conveyor,
   wherein the display displays a first screen for the stapled document sheets if the controller determines that the stapled document sheets are conveyed by the conveyor,
   wherein the display displays a second screen for the jam according to the detection of the occurrence of the jam, and
   wherein a display content of the first screen is different from a display content of the second screen.

2. The image reading apparatus according to claim 1, wherein
   the first screen is a screen for notifying that document sheets are stapled.

3. The image reading apparatus according to claim 1, wherein
   a part of the display content of the first screen is not included in the second screen.

4. The image reading apparatus according to claim 1, wherein
   the display content of the first screen includes display regarding disabling of a function for determining whether stapled document sheets are conveyed by the conveyor.

5. The image reading apparatus according to claim 4, wherein
   the display content of the second screen does not include display regarding disabling of a function for determining whether stapled document sheets are conveyed by the conveyor.

6. The image reading apparatus according to claim 1, wherein the conveyor conveys document sheets one by one from a document sheet tray.

7. The image reading apparatus according to claim 1, further comprising a sensor,
   wherein the controller determines whether stapled document sheets are conveyed by the conveyor, based on the conveyance state detected by the sensor.

8. The image reading apparatus according to claim 7, further comprising another sensor,
   wherein the controller further detects, using the another sensor, occurrence of the jam of document sheets conveyed by the conveyor.

9. The image reading apparatus according to claim 1, wherein
   the image reading apparatus receives a setting whether to disable a function for determining whether stapled document sheets are conveyed by the conveyor.

10. The image reading apparatus according to claim 9, wherein the image reading apparatus receives the setting whether to disable the function for determining whether stapled document sheets are conveyed by the conveyor, based on a conveyance state of document sheets conveyed by the conveyor before conveyance of the document sheets is started.

11. The image reading apparatus according to claim 1, further comprising a printer that prints the image read by the reader.

12. A display method comprising:

conveying a document sheet;

reading an image on the conveyed document sheet;

determining whether stapled document sheets are conveyed, based on a conveyance state of document sheets;

detecting occurrence of a jam of conveyed document sheets;

displaying a first screen for the stapled document sheets if it is determined that the stapled document sheets are conveyed; and displaying a second screen for the jam according to the detection of the occurrence of the jam, wherein a display content of the first screen is different from a display content of the second screen.

13. A non-transitory computer readable storage medium for storing a computer program for performing a control method for controlling an image reading apparatus, the control method comprising:

conveying a document sheet;

reading an image on the conveyed document sheet;

determining whether stapled document sheets are conveyed, based on a conveyance state of document sheets;

detecting occurrence of a jam of conveyed document sheets;

displaying a first screen for the stapled document sheets if it is determined that the stapled document sheets are conveyed; and displaying a second screen for the jam according to the detection of the occurrence of the jam, wherein a display content of the first screen is different from a display content of the second screen.

\* \* \* \* \*